United States Patent
Shigeta

(10) Patent No.: US 7,813,336 B2
(45) Date of Patent: Oct. 12, 2010

(54) SERVICE PROVIDING SYSTEM COOPERATIVE WITH VOIP AND WEB ENVIRONMENTS AND A METHOD THEREFOR

(75) Inventor: Yoshiaki Shigeta, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1589 days.

(21) Appl. No.: 11/099,469

(22) Filed: Apr. 6, 2005

(65) Prior Publication Data

US 2005/0226225 A1 Oct. 13, 2005

(30) Foreign Application Priority Data

Apr. 8, 2004 (JP) .............................. 2004-113749

(51) Int. Cl.
*H04L 12/66* (2006.01)

(52) U.S. Cl. ........................................ 370/354; 370/467

(58) Field of Classification Search ......... 370/352–356, 370/466–467
See application file for complete search history.

(56) References Cited

U.S. PATENT DOCUMENTS 7,436,817 B2 * 10/2008 Bienn et al. .................. 370/352
7,460,520 B2 * 12/2008 Cody et al. .................. 370/352

FOREIGN PATENT DOCUMENTS

JP 2003303159 A 10/2003

OTHER PUBLICATIONS

Shinya Itou, "Application Platform for Integrating Web and VoIP", OKI Technical Review, OKi Electric Industry Co., Ltd., Jan. 1, 2004, vol. 71, No. 1, pp. 18-21.
RFC ( Request for Comments) 3261 defined by the IETF (International Engineering Task Force), Jun. 2002.
Anders Kristensen, "SIP Servlet API Version 1.0", 108 pages, Feb. 4, 2003.

* cited by examiner

*Primary Examiner*—Simon Sing
(74) *Attorney, Agent, or Firm*—Rabin & Berdo, P.C.

(57) ABSTRACT

In a communication system, a request is generated from a Web browser as a call attempt. A call attempt manager is booted in response to the request under the HTTP protocol. The request is turned by cooperative managers into a request under the SIP protocol, which will be processed by another call attempt manager. A response to the result of processing by the other manager is sent to a Web browser in a reverse direction on the transmission path of the request for display on the Web browser. Service proxy UA managers and the cooperative managers on both systems are brought into play in order so that the response is registered in a service proxy user agent. The result of the registration is returned to the Web system in the direction reverse to the processing result. A task is subsequently executed from the Web system to establish a call.

21 Claims, 22 Drawing Sheets

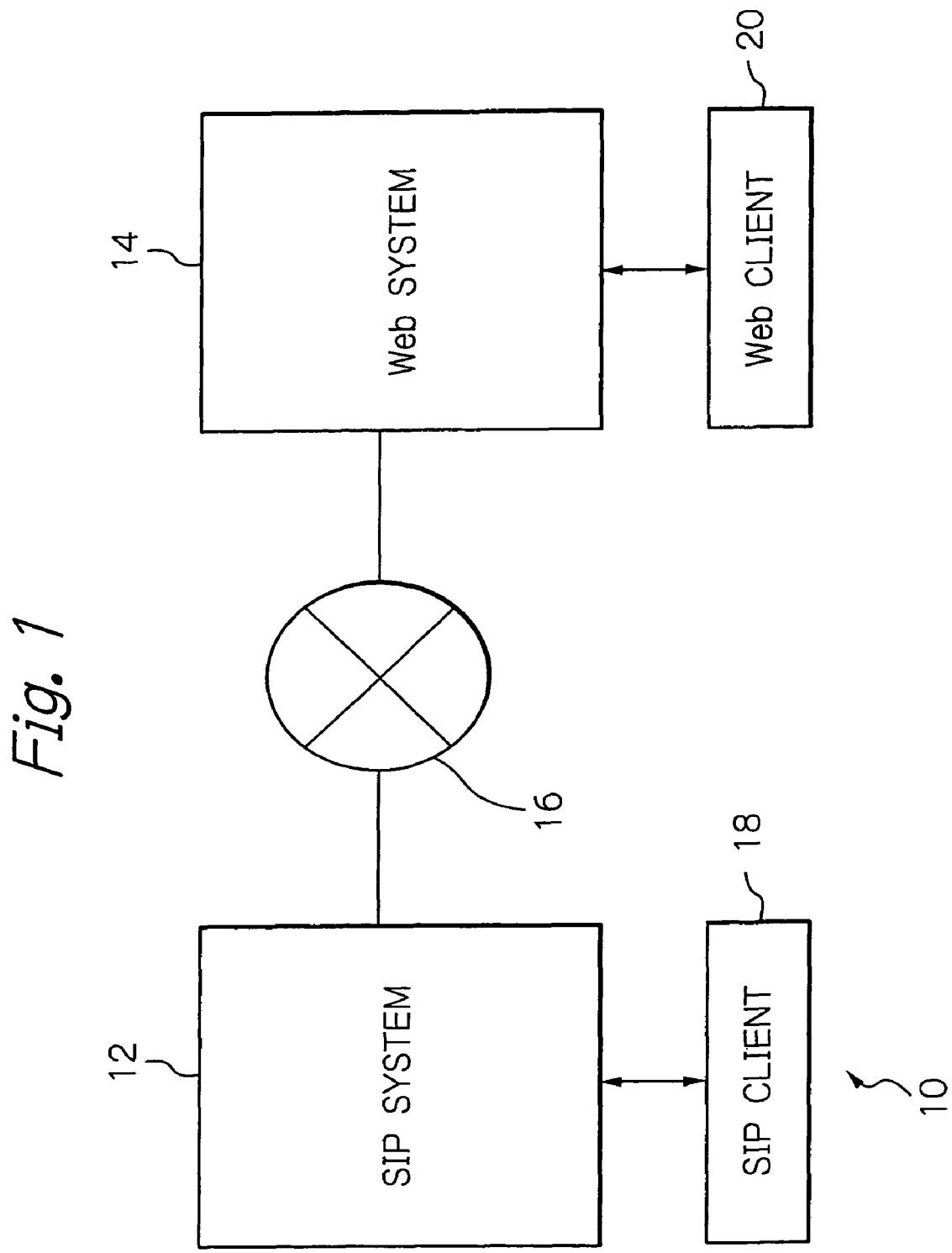

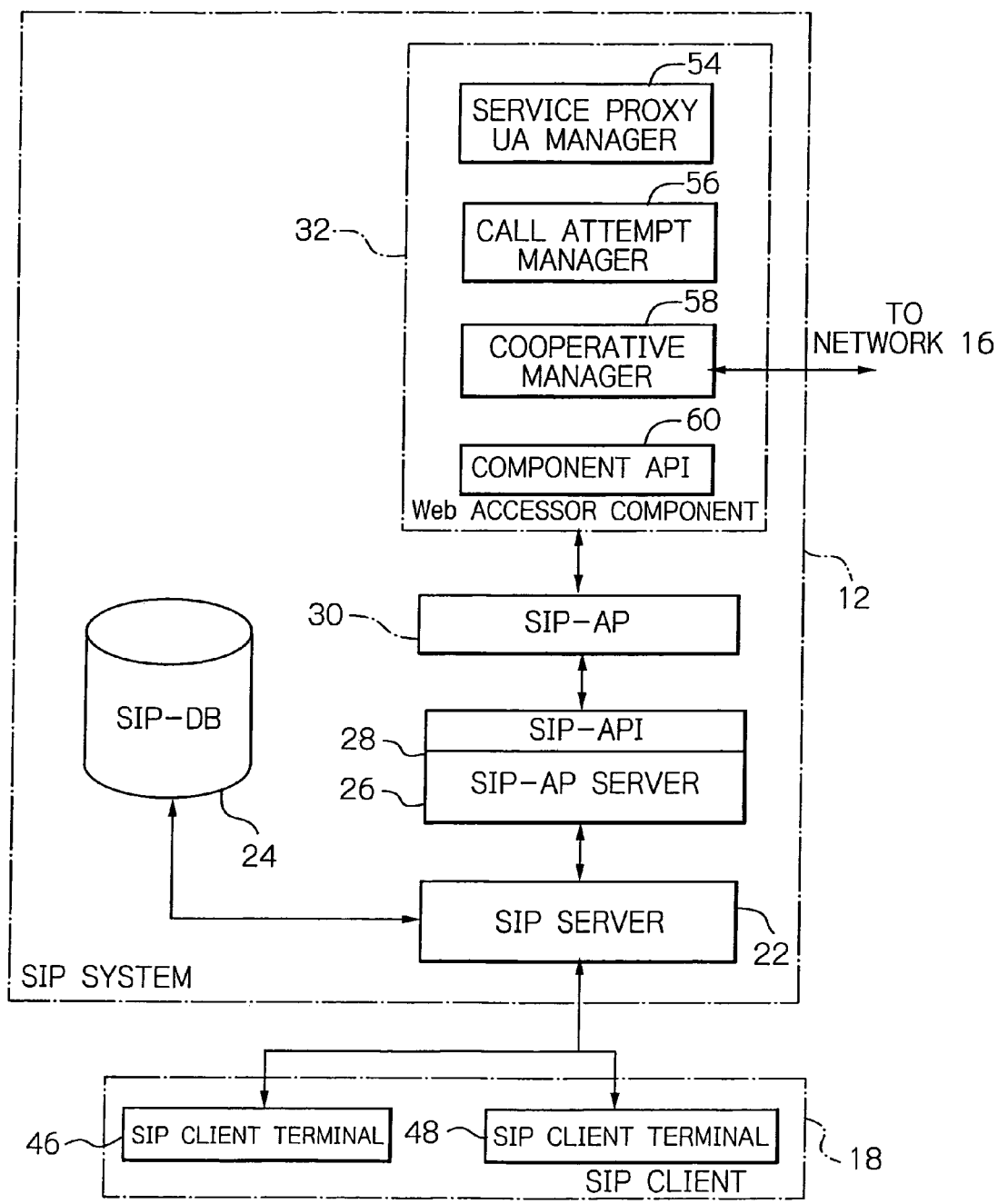

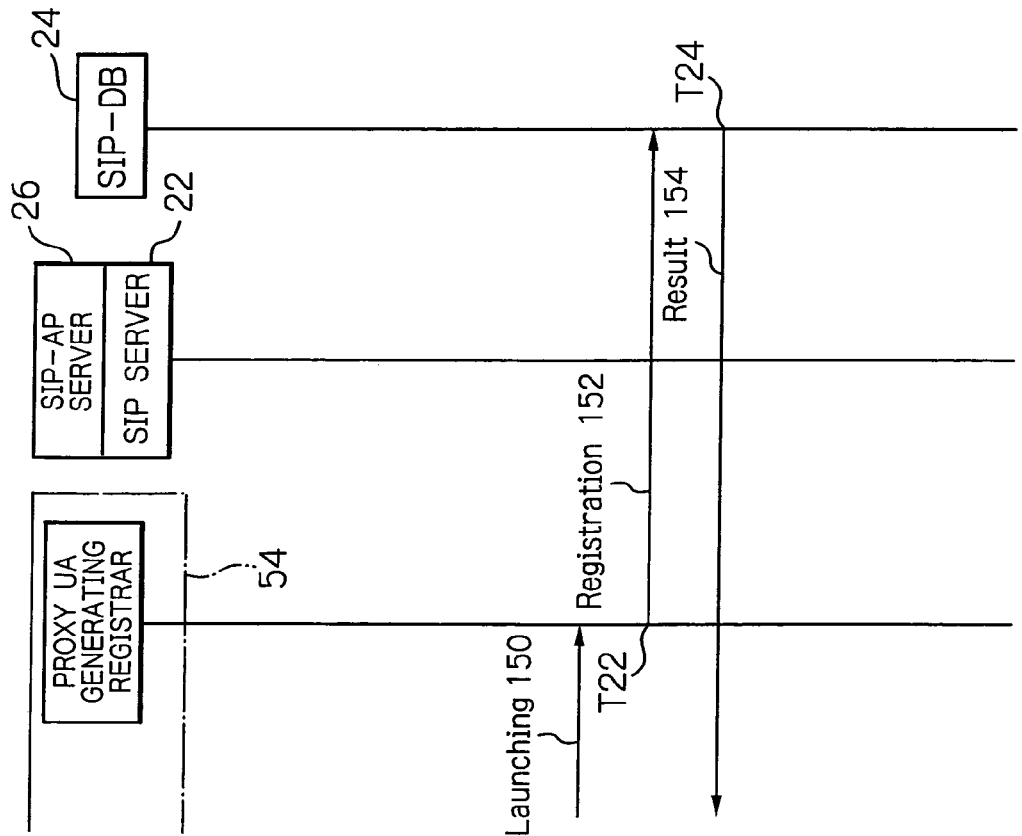

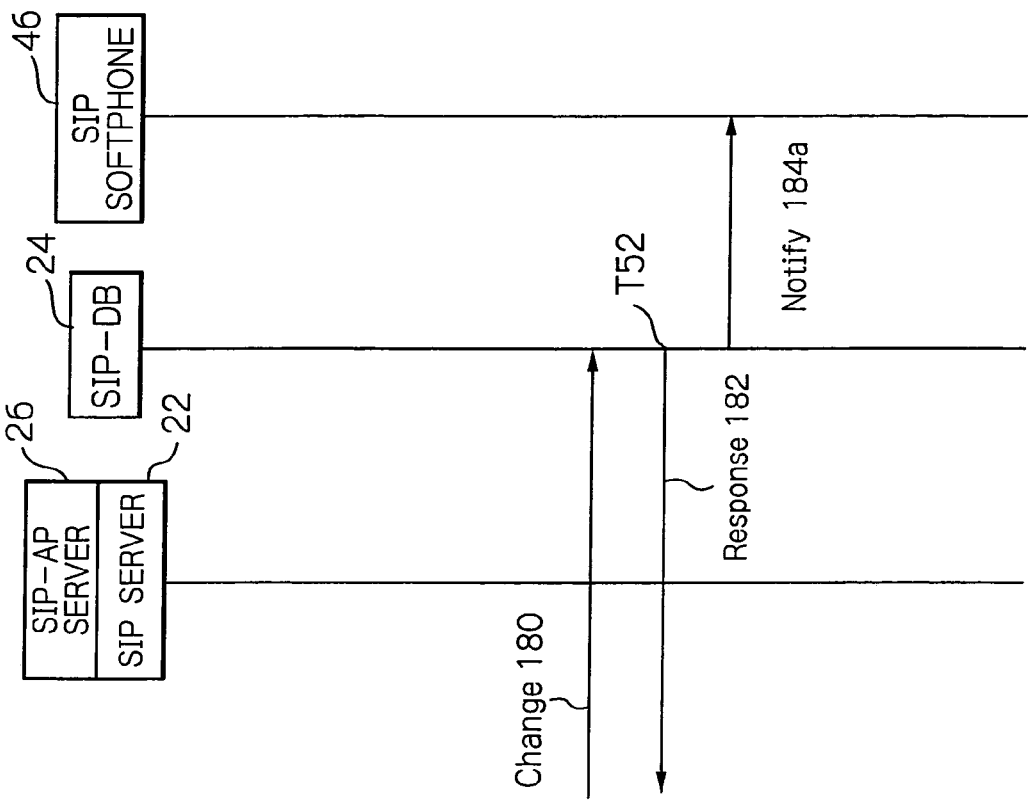

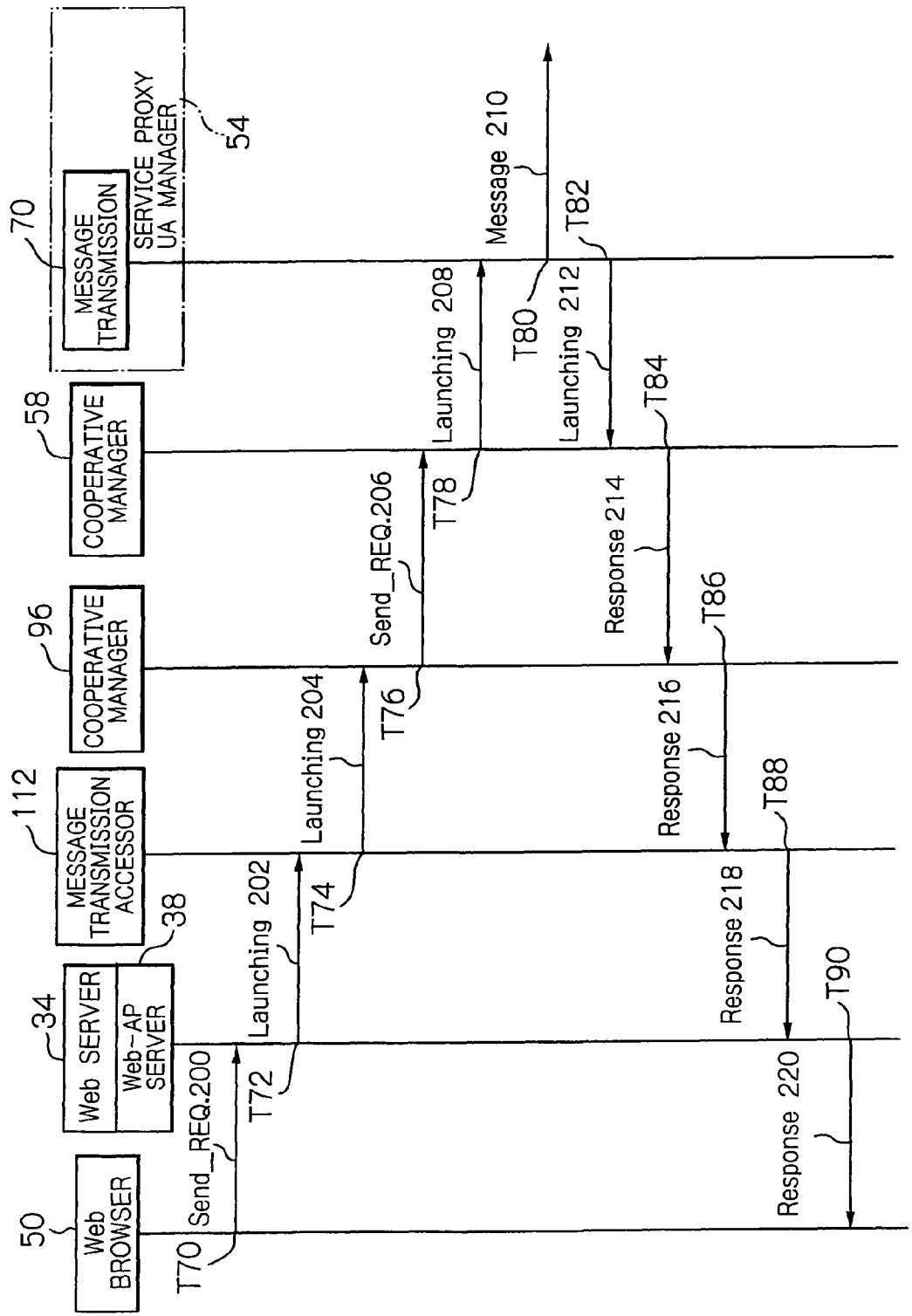

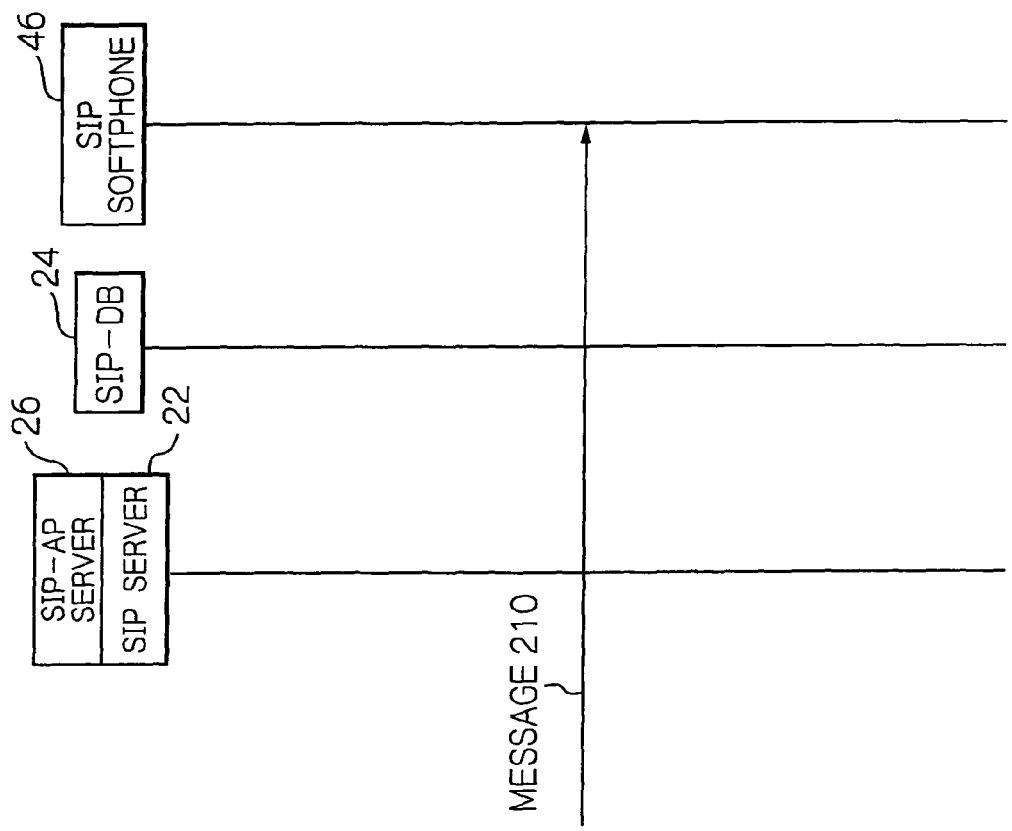

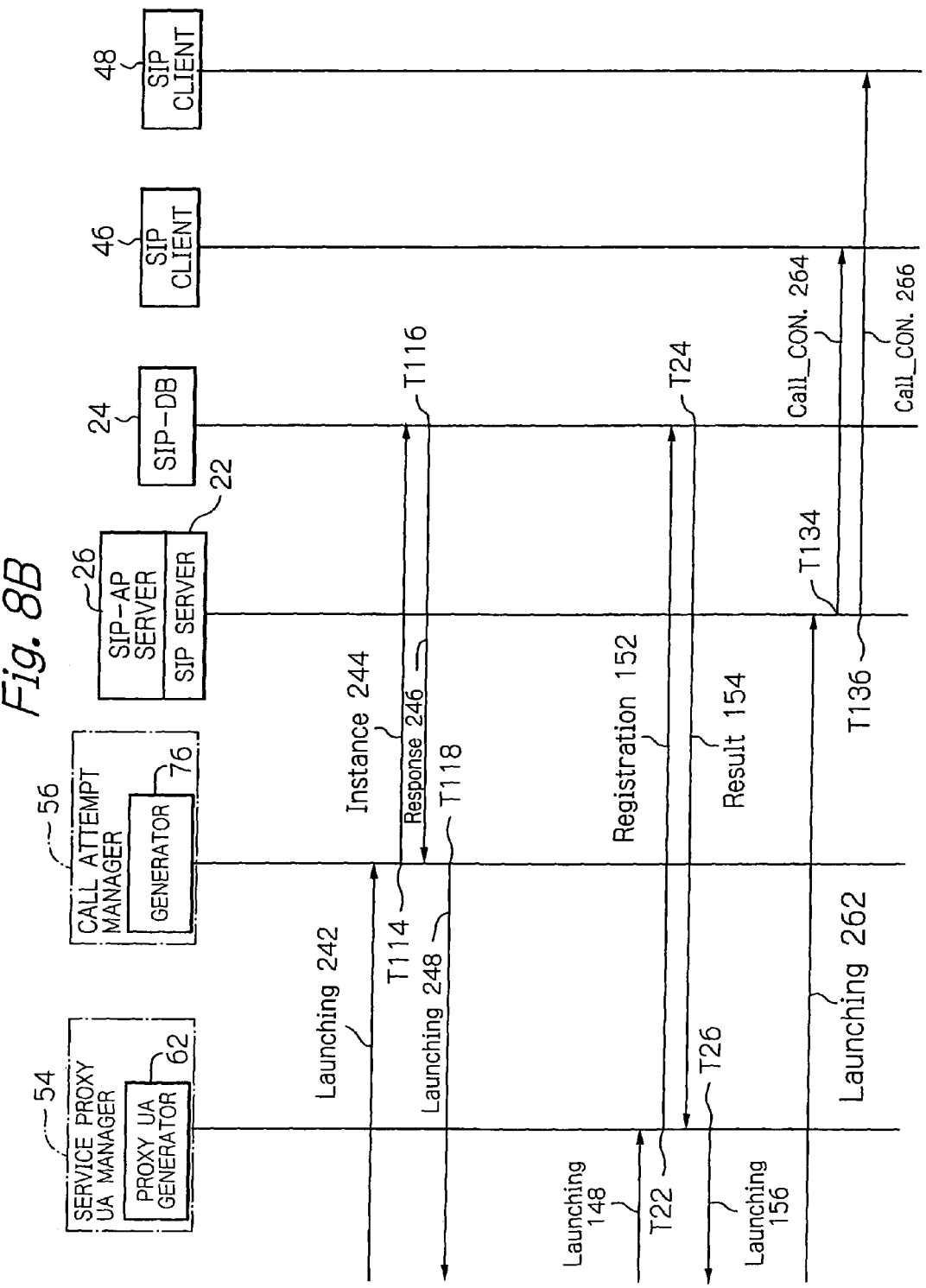

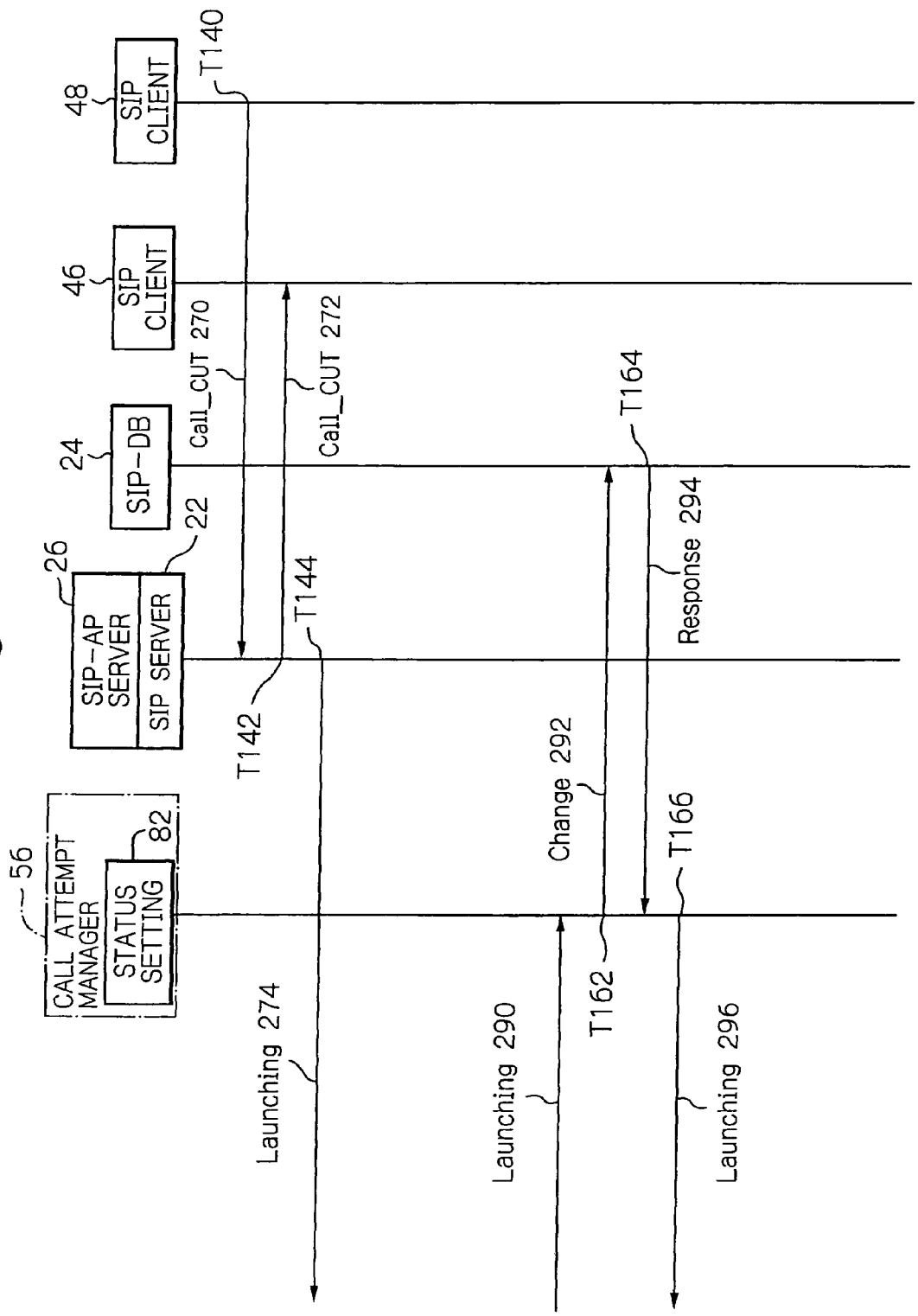

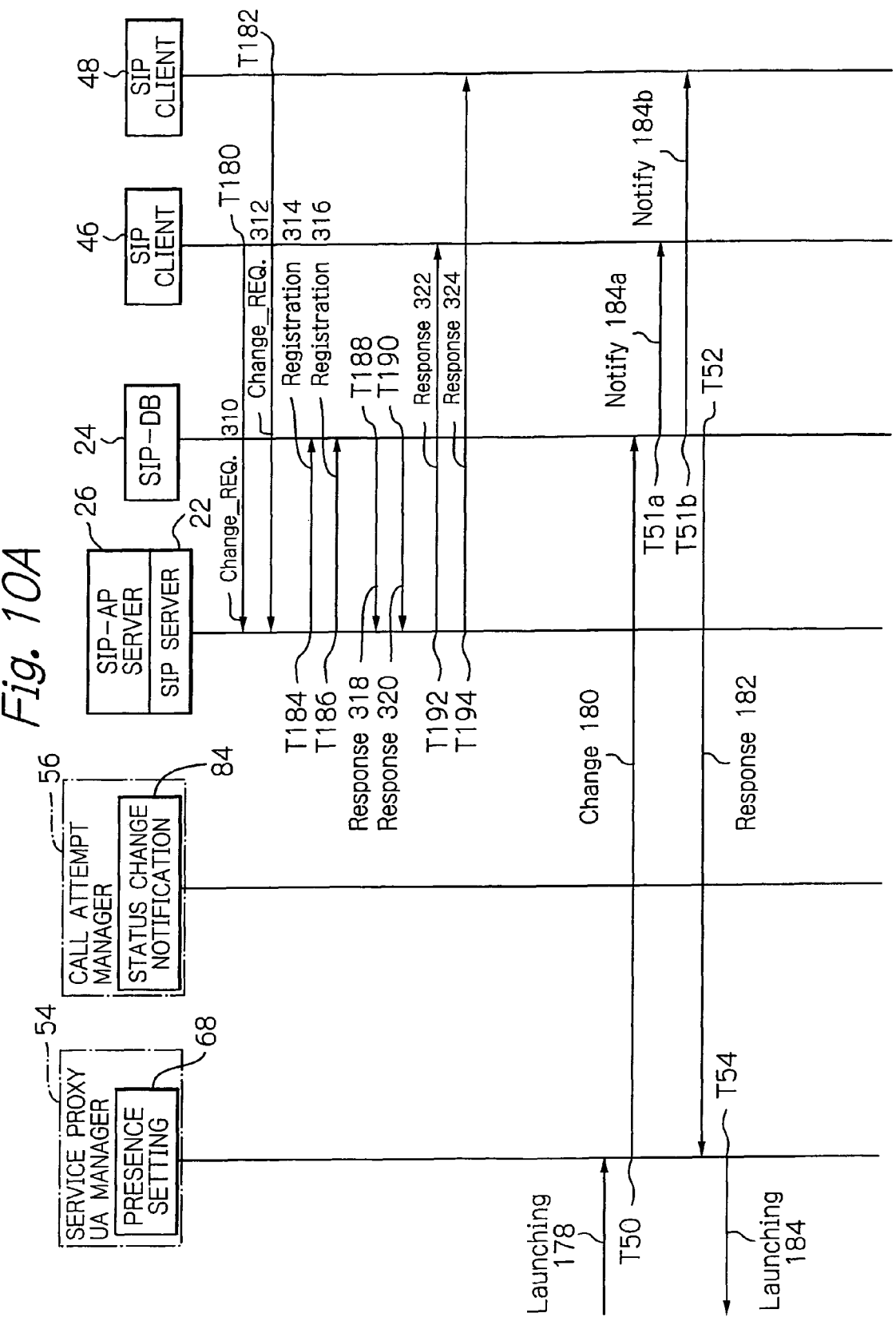

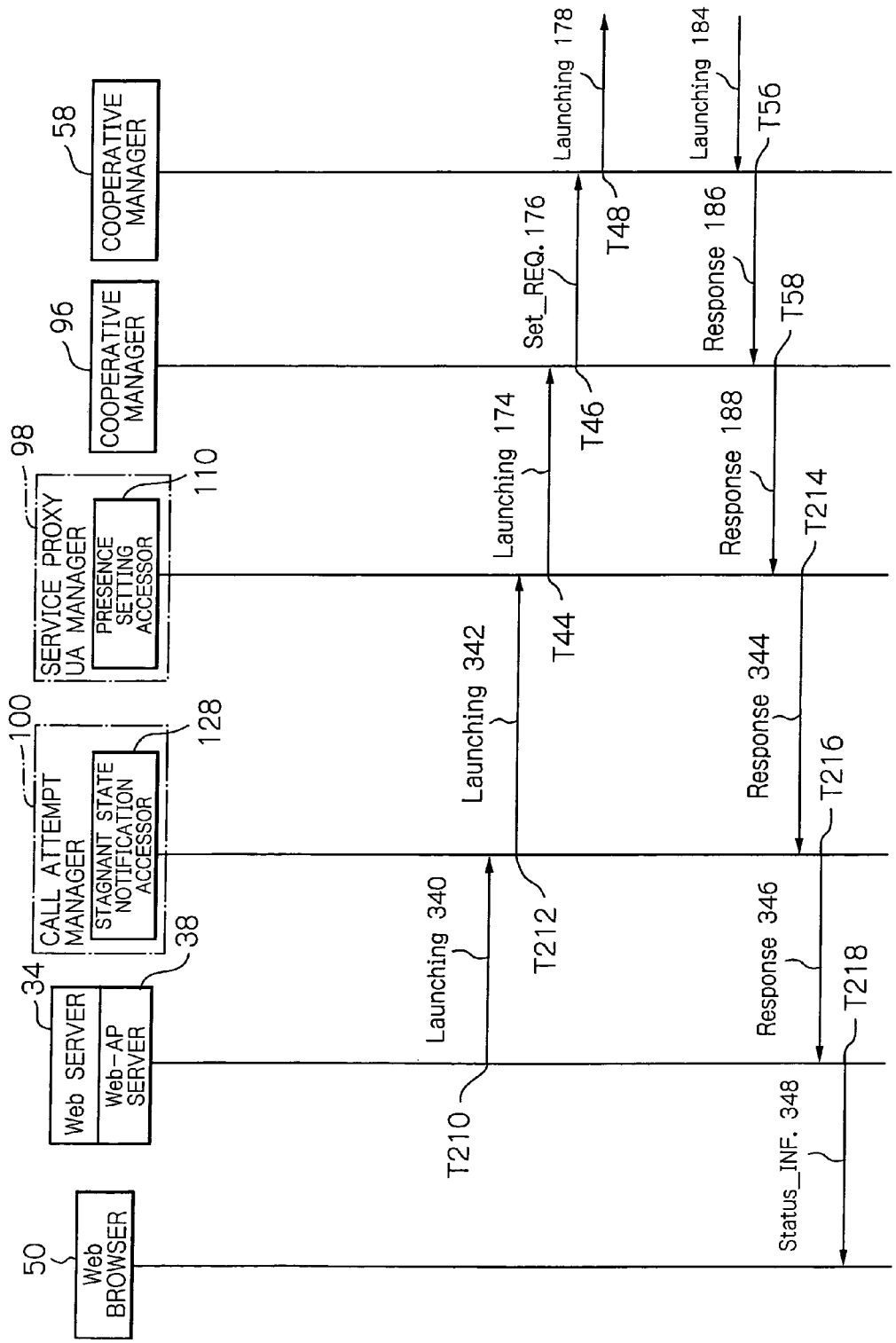

SERVICE PROVIDING SYSTEM COOPERATIVE WITH VOIP AND WEB ENVIRONMENTS AND A METHOD THEREFOR

BACKGROUND OF THE INVENTION

1. Field of the Invention

The present invention relates to a service providing system and a method therefor. More specifically, the present invention relates to a service providing system in which different environments, such as a SIP environment, operating based on a session initiation protocol (SIP), and the Web (World Wide Web) environment, are made cooperative with each other to get plural applications cooperate with one another to present services to clients connected to the systems.

The present invention also relates to a service providing method in which plural applications operating in different environments are made cooperative with one another to present services. More particularly, the present invention provides a communication process management type of application (AP) in which, e.g. the log of VoIP (Voice over Internet Protocol) communication, booted from a Web browser, is managed in association with the state of accomplishment of the objective of the communication in order for the system to support execution of the communication and the accomplishment of the objective.

2. Description of the Background Art

Heretofore, no endeavor has been made to make the SIP based application (AP) environment cooperate with the Web-based application (AP) environment, but the SIP based AP environment and the Web-based AP environment have been implemented as different AP environments. The reason therefor may be such that the conventional Web-AP environment is used for constructing an information system for business organizations or information providing type AP services supplied by the ISPs (Internet Service Providers), whilst the SIP-AP environment is used for constructing telephone-based services. That is, both systems are used for different purposes.

For cooperation and interconnection of different server environments, implemented by these different communication protocols, a system is generally used which is mediated by a protocol conversion gateway. As a protocol converting gateway, there is employed an HTTP-SIP conversion gateway for implementing interconnection conversion functions for the HTTP (Hyper Text Transfer Protocol) protocol, a protocol for the Web environment, and the SIP protocol, the protocol for the SIP environment.

The HTTP-SIP conversion gateway renders it possible to implement only simple functions which come into play in accordance with a protocol converting rule which is built into the HTTP-SIP conversion gateway at the outset. It has, however, been recognized that, in an application in which plural persons control the situations of plural communications for a common objective, such control cannot be flexibly carried out with a sole communication system exploiting the HTTP-SIP conversion gateway or with the conversion gateway.

As an example of such an application difficult to implement, a system of a relatively large scale could be proposed. More specifically, a system could be proposed in which usually plural businessmen or system engineers (SEs) proceed to business affairs while they communicate with plural contact men or personnel in charge from a customer company. In the course of this proposal, plural men execute plural communications, such as business negotiations or technical proposals.

In executing the communications, it has been recognized to be desirable to construct communication systems on the objective-by-objective basis.

It is also desirable that the progress in accomplishing the objectives is made associated with the presence on a database in a SIP environment to report the changes in the statuses or the changing statuses resultant from the execution of plural communications. However, should the system be constructed in this way, the system would have to reserve HTTP transactions for prolonged time. That is, the system proposed may not be said proper from the perspective of efficacious utilization of the resources or implementation of a user interface as a practical application.

SUMMARY OF THE INVENTION

It is an object of the invention to provide a service providing system and a service providing method whereby the problem inherent in the above-described conventional technique may be resolved and whereby monistic status management may be achieved from the perspective of performing plural communications.

In accordance with the present invention, a service providing system is provided for transmitting and receiving information to and from a plurality of clients interconnected to a plurality of systems constructed in environments of different communication protocols for providing the information as a service, in which the service providing system comprises a first system operating based on a first communication protocol, and a second system operating based on a second communication protocol. The first system includes a first cooperative manager for processing first information to be sent to the second system in accordance with a third communication protocol as second information to be dealt with in common to the first communication protocol and the second communication protocol cooperative with each other, and third information provided from said second system in accordance with the third communication protocol as fourth information in accordance with the first communication protocol. The first system also includes a first proxy manager for regarding a requested service instance to be a client of the first system to virtually supervise the instance as a user agent and for operating the information supervised, and a first call attempt manager for operating and managing information in a call attempt which is an instance of an object from call origination by one of the clients interconnected to the first system until accomplishment of an objective of call. The second system includes a second cooperative manager for processing the third information to be sent to the first system in accordance with a third communication protocol and for processing the second information in accordance with the third communication protocol, and for processing the second information received from the first system as fifth information in accordance with the second communication protocol. The second system also includes a second proxy manager for accessing a corresponding function of the first proxy manager in connection with the requested service instance from the second system by a virtual user agent, and for acquiring a result of execution of the service instance, and a second call attempt manager for accessing a corresponding function of the first call attempt manager from the second system.

In the service providing system of the present invention, if a request from a client interconnected to the second system is to be executed as a call attempt, the second call attempt manager for this request is booted in the second communication protocol. This request is rendered a request of the third communication protocol by the second cooperative manager and sent to the first cooperative manager, where it is turned into a request of the first communication request. A response of the result of processing is sent via the first call attempt manager, first and second cooperative manager and second call attempt manager to a client having made the request for display. The second proxy manager, second cooperative manager, first cooperative manager and second proxy manager are operated in order for registration. The result of the registration is returned by the reverse sequence to the second system and the task is executed from the second system. In this manner, a call corresponding to an instance of call origination between heterogeneous communication protocols may be set up to achieve monistic status management.

Further in accordance with the present invention, also provided is a method providing a service for transmitting and receiving information to and from a plurality of clients interconnected to a plurality of systems constructed in environments of different communication protocols for providing the information as a service. The method comprises a first step of preparing a first system operating in accordance with a first communication protocol and a second system operating in accordance with a second communication protocol; a second step of processing first information to be sent out from the first system in accordance with a third communication protocol as second information to be dealt with in common to the first communication protocol and the second communication protocol cooperative with each other; and a third step of processing the second information received by the second system as third information in accordance with the second communication protocol to output the third information; The method further comprises a fourth step of processing fourth information supplied to the second system in accordance with the second communication protocol as fifth information in accordance with the third communication protocol to send out the fifth information, and a fifth step of processing the fifth information received by the first system as sixth information in accordance with the first communication protocol to output the first information. The method further comprises a sixth step of regarding as a call attempt an instance of an object from call origination by one of clients interconnected to the first system until accomplishment of an objective of call, selecting, among clients of the second system, a candidate of communication as a task from a contact list of candidates of communication, and generating a first boot signal booting an access from the second system to a corresponding function of the first system, inclusive of a status representing a state of accomplishment of an objective, responsive to the call attempt consistent with the selected task and with the status. The method also comprises a seventh step of generating a second boot signal for booting said fourth step, in connection with the first boot signal; an eighth step of sequentially executing said fourth and fifth steps; a ninth step of generating a third boot signal for booting a corresponding function in said first system; a tenth step of processing information corresponding to the function booted by the third boot signal; an eleventh step of generating, responsive to a response signal to said tenth step, a fourth boot signal booting said second step and including the response signal; a twelfth step of sequentially executing said second and third steps; a thirteenth step of returning the response signal to a source which has generated the second boot signal; and a fourteenth step of returning the response signal to a source which has generated the first boot signal. The method further comprises a fifteenth step of processing the response signal to send the processed response signal to the clients of the second system, accessing a proxy user agent, which acts as a proxy for the selected task as a virtual user agent, through said fourth and fifth steps, to register the information on the task, and receiving a response to the registration through said second and third steps; and a sixteenth step of booting, responsive to the response to the registration, the first system from the second system through said fourth and fifth steps to establish communication between the clients of the first system.

In the service providing method of the present invention, first and second boot signals, including a status, are generated responsive to a status and a call attempt consistent with a task selected from a contact list by a second system, and said fourth and fifth steps are carried out in order. A third boot signal is generated in the first system, and the information is processed in keeping with the function booted by the third boot signal. A fourth boot signal, inclusive of the response information to this information processing, is generated, the response information is returned to a client in the second system through the second and third steps, and a proxy user agent in the first system is accessed from the second system to register the information on the task. After notifying the completion of the registration to the second system, the first system is booted from the second system to establish client-to-client communications in the first system, whereby the task may be executed from the Web to implement the communication process management type of applications.

BRIEF DESCRIPTION OF THE DRAWINGS

The objects and features of the present invention will become more apparent from consideration of the following detailed description taken in conjunction with the accompanying drawings in which:

FIG. 1 is a schematic block diagram showing a preferred embodiment of a communication system in accordance with a service providing system of the present invention;

FIG. 2 is a schematic block diagram showing the structure of a SIP environment in the communication system of FIG. 1;

FIGS. 5A and 5B are a sequence chart useful for understanding the operational sequence for a request for providing a service in the communication system shown in FIG. 3;

FIGS. 6A and 6B are a sequence chart useful for understanding the operational sequence for presence setting in the communication system shown in FIG. 3;

FIGS. 7A and 7B are a sequence chart useful for understanding the operational sequence for a request for message transmission in the communication system shown in FIG. 3;

FIGS. 8A and 8B are a sequence chart useful for understanding the operational sequence until a call is established by a call attempt in the communication system shown in FIG. 3;

FIGS. 9A and 9B are a sequence chart useful for understanding the operational sequence for status setting by a call attempt in the communication system shown in FIG. 3;

FIGS. 10A and 10B are a sequence chart useful for understanding the operational sequence for notifying status changes by a call attempt in the communication system shown in FIG. 3;

FIG. 11 is a sequence chart useful for understanding the operational sequence for notifying a status stagnation by a call attempt when the status has become stagnant from the processing shown in FIG. 10A;

DESCRIPTION OF THE PREFERRED EMBODIMENTS

Figure 3A:
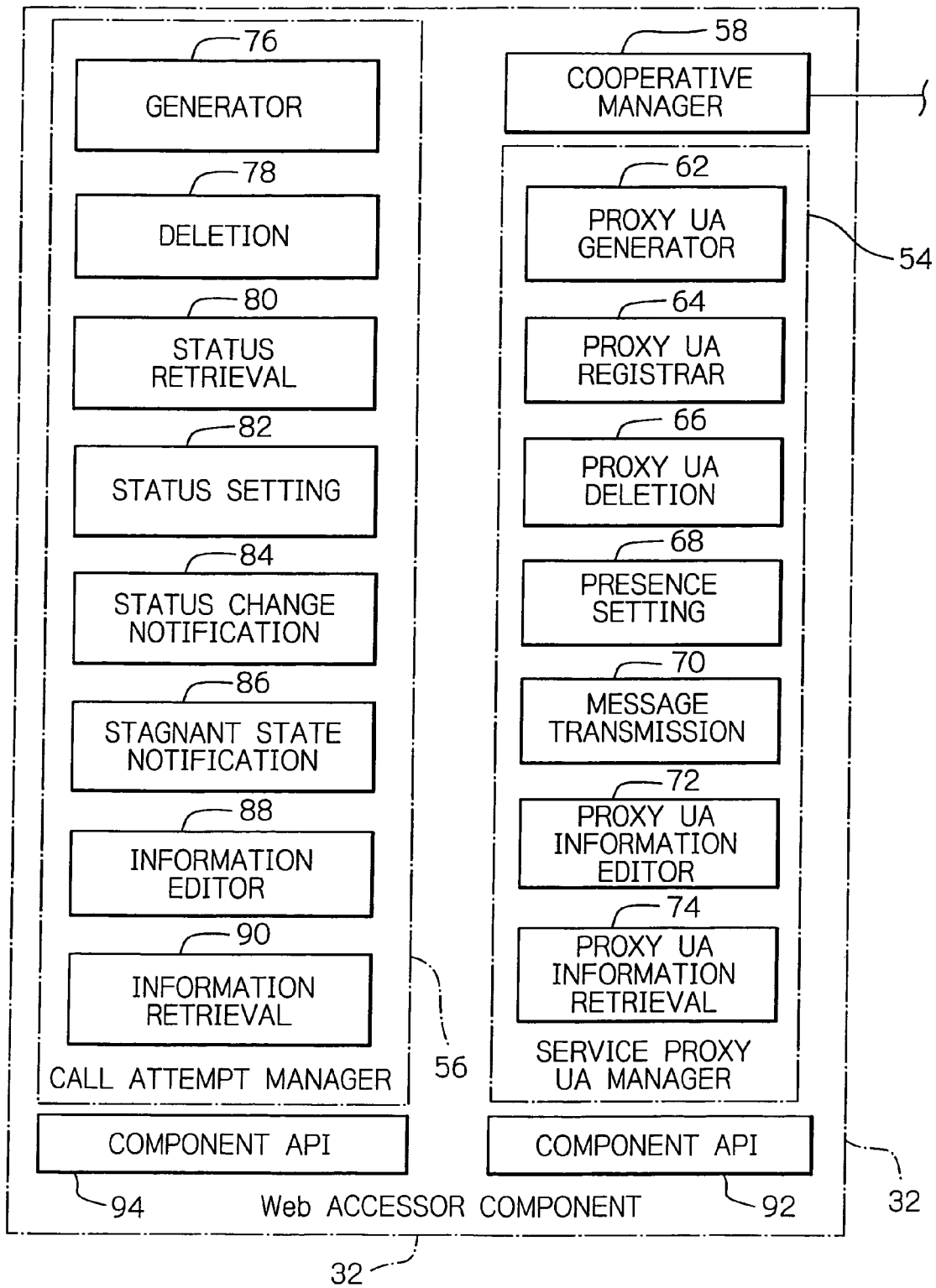
FIGS. 3A and 3B schematically show the structure of an access or component in the communication system of FIG. 1.

With reference to FIG. 1, a preferred embodiment of the service providing system in accordance with the present invention is applied to a communication system 10. It is noted that portions of the system, not directly relevant to understanding the present invention, are not shown in the drawings nor described.

The communication system 10 of the present embodiment includes a SIP system 12, a Web system 14, a SOAP/CORBA (Simple Object Access Protocol/Common Object Request Broker Architecture) network 16, a SIP client 18 and a Web client 20, which are interconnected as shown in FIG. 1. In the communication system 10, the SIP and Web systems 12 and 14 are interconnected via SOAP/CORBA network 16. The SIP and Web systems 12 and 14 are arranged in network environments belonging to different network domains, and are provided with functional blocks which complement the Web and SIP environments, respectively, and which are not inherently owned by the SIP system 12 and not inherently owned by the Web system 14, respectively. Thus, the communication system 10 has a sole environment in keeping with a system in which the SIP and Web systems 12 and 14 are arranged in a LAN environment within the same server computer or within the same domain.

The SOAP/CORBA network 16 implements the communication protocol responsible for mediating the information between the SIP and Web systems 12 and 14 to interconnect the two systems. The SOAP protocol is a communication protocol which prescribes the data format or the processing routine of messages transmitted between Web services. The SOAP/CORBA network 16 is a network in which, when the SOAP protocol is used, a service requester, a service provider and a service broker transmit and receive SOAP messages which are in keeping with the prescriptions, and the CORBA architecture is a distributed object technique implemented by OMG (Object management Group).

As seen from FIG. 2, the SIP client 18 is connected to a SIP server 22, and includes a client environment of exploiting the functions provided by a SIP-AP server 26. A typical example of the SIP client is a SIP softphone. In the present embodiment, SIP client terminals 46 and 48 are used.

Figure 4:
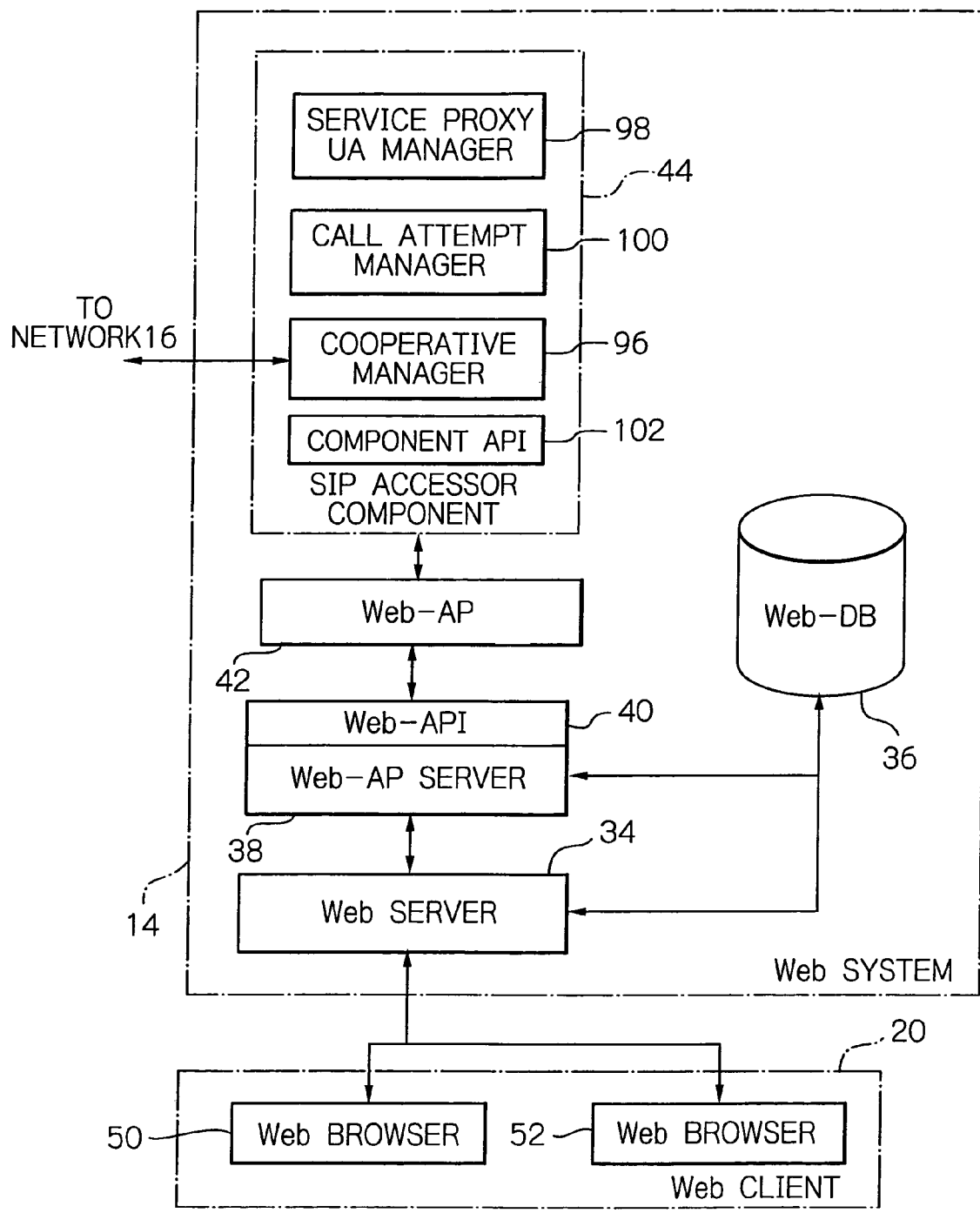
FIG. 4 is a schematic block diagram showing the structure of a Web environment in the communication system shown in FIG. 3.

In FIG. 4, the Web client 20 is connected to a Web server 34, and includes a client environment of exploiting the functions provided by a Web-AP server 38. A typical example of the Web client is a Web browser. In the instant embodiment, Web browsers 50 and 52 are used. The Web browser 52 is for maintenance.

The components of the above-described SIP and Web systems 12 and 14 will briefly be described with reference to FIGS. 2 and 4. The SIP server 22 is adapted to respond to a request from a client based on the SIP protocol, a protocol of a client-server model carrying out end-to-end communication. The SIP server 22 specifically has the functions of handling and managing the SIP protocol conforming to, e.g. the RFC (Request for Comments) 3261 prescribed in particular by the International Engineering Task Force (IETF). Among the prescribed management functions, the SIP server 22 includes, in general, three server functions, that is, a SIP proxy server function, a SIP registrar server function and a SIP location server function. The SIP proxy server function is of relaying a SIP message as a proxy for a client. The SIP registrar server function is of supervising the client registration, and the SIP location server function is of supervising, e.g. the address information of the registered client. The SIP server 22 is connected to the SIP client terminals 46 and 48, part of the SIP client 18, to transmit and receive the information supplied from the SIP-AP server 26 in the form of SIP message.

A SIP database (SIP-DB) 24 is a storage device, supervised by the SIP server 22, for storing, e.g. user information and presence information associatively with each other. The SIP database is connected to the SIP server 22, and has the function of providing the information responsive to a retrieval request from the SIP server 22. In the SIP database 24, user information includes address information of a client and information used for authentication. Presence information includes information on whether or not a client is connected to the SIP system 12, whether or not a client has been booted or exploited, and whether or not a client is involved in connection to another client.

The SIP-AP server 26 is a server responsive to an operation to actuate an application supervised by the SIP server 22 based on the SIP protocol. The SIP-AP server 26 is connected to the SIP server 22 and to a SIP AP interface (SIP-API) 28. The SIP-AP interface 28 has the function of transmitting a SIP request, received by the SIP server 22, to an application, and of issuing a request to the SIP server 22. Examples of the SIP request include requests for session establishment, acknowledgement, end of call and for change of presence.

The SIP-AP interface 28 is an application interface provided by the SIP-AP server 26. The SIP-AP server 26 is connected via SIP-AP interface 28 to a SIP application (SIP-AP) 30. A typical SIP-AP interface 28 is a SIP Servlet AP interface which is being standardized by the Java (Trademark) Community Process (JCP).

The SIP application 30 is an application constructed by the SIP-AP interface 28 connected thereto and runs on the SIP-AP server 26. Examples of the SIP application 30 include IP (Internet Protocol) telephone, instant messages, TV (television) telephone and presence communication.

A Web accessor component 32 is a generic name of components by means of which the SIP application 30 cooperates with the Web system 14. Thus, the Web accessor component 32 is invoked when the SIP application 30 is in operation, and is used in the course of communication with a SIP accessor component 44 of the Web system 14 as will later be described. The Web accessor component 32 may be exemplified by a service proxy user agent (UA) manager 54, a call attempt (CA) manager 56, a cooperative manager 58 and a component application interface (component API) 60, as shown for example in FIG. 2.

The Web access or component 32 will further be described with reference to FIG. 3A. The service proxy UA manager 54 has the function of operating and supervising the service proxy UA information supervised in the SIP system 12 of the SIP environment. The service proxy user agent regards a service instance as SIP clients and accomplishes services as a user agent virtually transmitting and receiving a request and a response between the so regarded SIP clients.

The service proxy UA manager 54 includes, as typical functional modules, a proxy UA generator 62, a proxy UA registrar 64, a proxy UA deleting function 66, a presence setting functional unit 68, a message transmitting function 70, a proxy UA information editor 72 and a proxy UA information retrieving functional unit 74. The proxy UA generator 62, proxy UA registrar 64 and the proxy UA deleting function 66 are of generating, registering and deleting the user agent associated with the service instance, respectively. The presence setting function 68 changes the presence information of the user agent associated with the service instance. The message transmission function 70 transmits a message to a specified user agent from a user agent associated with the service instance. The message may, for example be a text string.

The proxy UA information editor 72 has the function of editing the user information of a user agent associated with the service instance. Finally, the proxy UA information retrieving function 74 is of retrieving the user information of a user agent associated with the service instance.

The call attempt manager 56 has the function of operating and managing call attempt information supervised in the SIP system 12 of the SIP environment. Since, for accomplishing an objective, plural communications are carried out repeatedly, statuses in the call attempt manager 56 are changed towards accomplishing the objective as the communication proceeds, with the statuses progressing with these status changes.

The functions will now be described more specifically. An instance of an object having its life time starting from a call origination which a calling party initially attempts to make to a fulfillment of the objective of the call is referred to as a call attempt. The call attempt manager 56 supervises the status during the life time of a call and the operation in conjunction with information such as calling party information, called party information or call attempt hysteresis information. The status is represented by a value indicative of information on the status of achieving an objective. The statuses may be exemplified by a completion, a response waiting, a message waiting and a re-request schedule. The call attempt information is a generic name of information on a calling and a called party of a call attempt, and hysteresis information on a call attempt.

The call attempt manager 56 includes a generator 76, a deleting functional unit 78, a status retrieval functional unit 80, a status setting functional unit 82, a status change notification functional unit 84, a stagnant status notification functional unit 86, an information editor 88 and an information retrieving functional unit 90. The generator 76 and the deleting function 78 have the functions of generating and deleting a call attempt associated with a call origination instance of the calling party, respectively. The status retrieval function 80 and the status setting function 82 are of retrieving and setting communication status information of a call attempt associated with a call origination instance, respectively.

The status change notification function 84 is responsive to status changes caused by operations by a calling party or a called party and notifies the changes to the progress of the statuses, such as call or an acknowledgement. The stagnant state notification function 86 notifies, for example, that, when a notification was made for dealing with a change and yet status changes were not made within a preset time, the change has not been dealt with. By this notification, the stagnant state notification function instigates and prompts the calling party or the called party to change the statuses. The information editor 88 and the information retrieving function 90 have the functions of editing and retrieving information on a calling party of a call attempt associated with a call origination instance, information on a called party and call attempt hysteresis information, respectively.

Component AP interfaces 92 and 94 are included in the component AP interface 60 and are interface with the SIP application 30, FIG. 2, to use the service proxy UA manager 54 and the call attempt manager 56.

The Web access or component 32 may be used in combination, from the SIP application 30, depending on which function is to be implemented as the specified SIP application 30, and may be extended in a desired manner, depending on an intended use, in addition to the components described above. By this addition and extension of the components, it is possible to add or expand variations in the cooperation with the Web system 14.

Figure 3B:
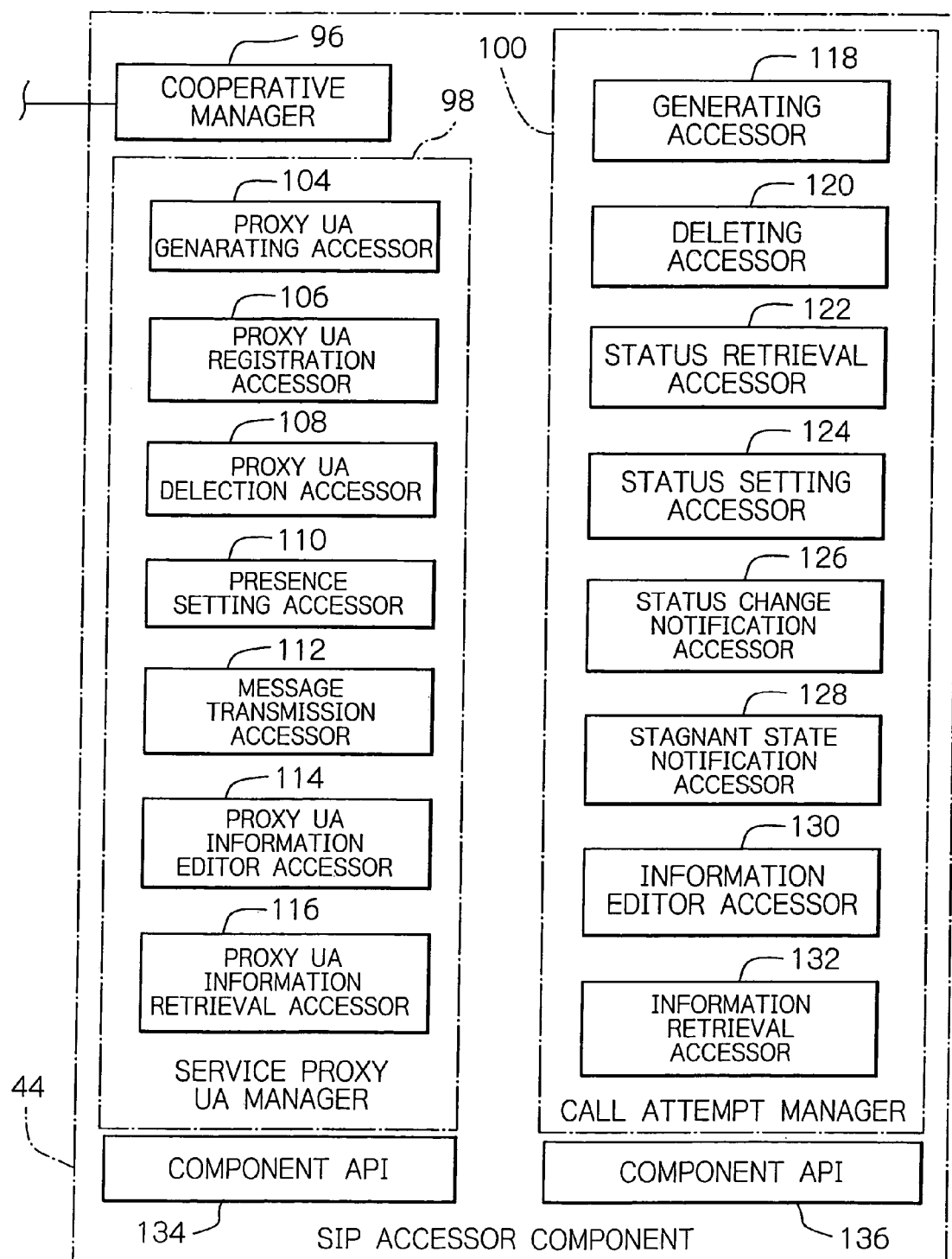

The cooperative manager 58 has the function of cooperating with a cooperative manager 96, FIG. 3B, in the Web system 14 to supervise the communication environment for accessing the service proxy UA manager 54 and the call attempt manager 56 from the Web system 14 or the Web system 14. The cooperative management environment may be exemplified by environmental setting corresponding to, for example, the SOAP protocol or CORBA architecture. The cooperative manager 58 has the function of converting information in conformity with a common communication protocol and the SIP protocol.

Referring now to FIG. 4, the Web system 14 will be described. The Web server 34 is adapted for handling and managing its operation based on the HTTP protocol. The Web server 34 is connected to Web browsers 50 and 52, part of the Web client 20. The Web server 34 is connected to and supervises a Web database (Web-DB) 36 and a Web-AP server 38.

The Web database 36 is a storage device for storing information managed by the Web server 34. Information to be managed may be exemplified by fee charging information and a use log for clients.

The Web-AP server 38 is usually in its operative state, and is adapted to be responsive to operation to run an application managed by the Web server 34 based on the HTTP protocol, a Web protocol. The Web-AP server 38 may be exemplified by an open-source Tomcat and WebLogic (trademark) by BEA System, Inc. The Web-AP server 38 is connected by a Web-AP interface 40 to a Web application 42. The Web-AP server 38 may operate an application based on information of the Web database 36.

The Web-AP interface 40 is an application interface provided by the Web-AP server 38. The Web-AP interface 40 may typically be HTTP Servlet AP interface and Enterprise Java (trademark) Beans (EJB), as prescribed by J2EE (Java2 Enterprise Edition) environment. The Web-AP interface 40 enables information to be transmitted and received between the Web-AP server 38 and the Web application 40.

The Web application 40 is constructed by the Web-AP interface 40, connected thereto. The Web application 40 is an application running on the Web-AP server 38, and is also connected to the SIP accessor component 44. For example, the Web application 40 includes applications, such as Internet shopping mall, business entity portal and contents distribution.

The SIP accessor component 44 is a genetic name of a set of components for the Web application 40 to cooperate with the SIP system 12, and is a library software invoked when the Web application 40 is in operation. The SIP accessor component 44 is used when the Web application 40 communicates with the Web accessor component 32 on the SIP system 12.

Similarly to the Web accessor component 32, the Web application 40 may be used in combination, in this case, from the Web application 40, depending on which function is to be implemented, in cooperation with the SIP-AP server 26. The SIP accessor component 44 may also be extended in a desired manner, depending on an intended use. By this addition and extension of the components, it is possible to add or expand variations in the cooperation with the SIP system 12.

The SIP accessor component 44 includes a service proxy UA manager 98, a call attempt manager 100, a cooperative manager 96 and a component AP interface 102. The service proxy UA manager 98 is a component in the Web system 14 of the Web environment accessing the service proxy UA information managed in the SIP system 12 of the SIP environment.

Referring back to FIG. 3B, the service proxy UA manager 98 will be described. The service proxy UA manager 98 includes the function of accessing the functions included in the service proxy UA manager 54 on the SIP environment side by the communication between the cooperative managers 58 and 96. The service proxy UA manager 98 includes a proxy UA generating accessor 104, a proxy UA registration accessor 106, a proxy UA deletion accessor 108, a presence setting accessor 110, a message transmission accessor 112, a proxy UA information editing accessor 114 and a proxy UA information retrieving accessor 116.

The proxy UA generating accessor 104, the proxy UA registration accessor 106 and the proxy UA deletion accessor 108 are modules for accessing the proxy UA generator 62, the proxy UA registrar 64 and the proxy UA deleting function 66 in the SIP system 12 in the Web system 14, respectively. The presence setting accessor 110 is a module for accessing the presence setting function 68 of the service proxy UA manager 54, from the service proxy UA manager 98, responsive to changes in the service presence status, in order to change the presence of the proxy user agent. The results of change of the status are notified through the SIP server 22 to a watcher of the presence information.

The message transmission accessor 112 is a module for accessing the message transmission function 70 of the service proxy UA manager 54, from the service proxy UA manager 98, responsive to changes in the status of service progress, to formulate or transmit a message of the proxy user agent. The message is notified to the receiving side via SIP server 22.

The proxy UA information editing accessor 114 and the proxy UA information retrieving accessor 116 are modules for accessing the proxy UA information editor 72 and the proxy UA information retrieving function 74 in the service proxy UA manager 54 in the SIP system 12 from the Web system 14.

In this manner, the totality of the functions, provided in the service proxy UA manager 98, access the corresponding functions in the service proxy UA manager 54 on the SIP environment side to achieve access from the Web environment side.

The call attempt manager 100 is a component in the Web system 14 for accessing call attempt information managed in the SIP system 12. The call attempt manager 100 includes a generating accessor 118, a deleting accessor 120, a status retrieval accessor 122, a status setting accessor 124, a status change notification accessor 126, a stagnant status notification accessor 128, an information editing accessor 130 and an information retrieval accessor 132.

The generating accessor 118 and the deleting accessor 120 are modules having the functions of accessing the generator 76 and the deleting function 78 of the call attempt manager 56 in the SIP system 12 from the Web system 14, respectively. The status retrieval accessor 122 and the status setting accessor 124 are modules having the functions of accessing the status retrieval function 80 and the status setting function 82 of the call attempt manager 56 in the SIP system 12 from the Web system 14, respectively.

The status change notification accessor 126 and the stagnant state notification accessor 128 are modules having the functions of accessing the status change notification function 84 and the stagnant state notification function 86 of the call attempt manager 56 in the SIP system 12 from the Web system 14, respectively. The information editing accessor 130 and the information retrieval accessor 132 are modules having the functions of accessing the information editor 88 and the information retrieving function 90 of the call attempt manager 56 in the SIP system 12 from the Web system 14, respectively.

The cooperative manager 96 has the function of cooperating with the corresponding cooperative manager 58 in the SIP system 12 and exploiting the service proxy UA manager 54 and the call attempt manager 56 to made access to the SIP system 12 or the Web system 14. For this function, the communication environment is set associated with the cooperative management of the SIP system 12. For this communication environment, used is the cooperative management environment, such as SOAP or CORBA.

The component AP interface 102 is arranged for use by the Web application 40. The component AP interface 102 includes a component AP interfaces 134 and 136 in association with the service proxy UA manager 98 and the call attempt manager 100, respectively, as shown in FIG. 3B.

With the above configuration, applications provided in the SIP and Web systems 12 and 14 may cooperate with each other to provide for making the SIP and Web systems 12 and 14 cooperative to enable the thus structured AP services to be provided to a user by real-time communications.

The operation of the communication system 10 will hereinafter be described. In the following description, signals are designated with reference numerals on connections on which appear the signals. With the communication system 10, a procedure will be described for enabling flexible cooperation between the SIP and Web applications 30 and 40, along with monistic situation management from the perspective of accomplishing objectives in plural communications, which was of a difficulty in the conventional cooperative system employing, e.g. an HTTP-SIP conversion gateway.

In general, communications are not always simply completed in such a fashion that communication is established between two parties and ultimately disconnected. Communications are carried out with objectives. It maybe said that communications are completed when objectives have been achieved. There are several stages in communications from the perspective of accomplishing objectives. Each of the stages over the progress of communications is termed a status, as referred to above.

On the whole, the statuses in communications are classified into completion, awaiting a response, awaiting a message and re-request scheduling. The status of completion indicates the accomplishment of an objective. The status of awaiting a response means that a request item is scheduled. The status of awaiting a message indicates that a request item has not been transmitted from a sender to a responder. The re-request scheduling means that a request item has not been transmitted from a requester.

The situation that a request has been made but is not conveyed to a responder corresponds to a situation in failure between the message awaiting status and the re-request scheduling status. More specifically, there maybe situations where an email sent to a counterpart entity in communication has not been read, a message memo is left unattended or a receiver has forgot to transfer the memo.

Communications are carried out repeatedly until the status has come to close. Should changes in the statuses be monistically managed by a certain URL (Uniform Resource Locator) site and displayed, the status of achievement of an objective of the communication can be visually grasped not only by the entities on the communication but also by a third party. That leads to the communication successfully carried out, and hence it is possible to avoid human errors such as forgetting making a reply or request. Specifically on communications to attain an important object, a manager or superintendent is able to adequately manage the progress or situation of the communication to afford proper instructions or hints.

Based on the above-described basic concept, the operation will be described in order, with reference to FIGS. 5A and 5B, upon accessing the SIP system 12 from the Web system 14 to generate a service proxy user agent. The Web browser 50, FIG. 4, of the Web client 20 issues at a timing T10 a request for execution of "service generation" (Gen._REQ. 140) to either one of the Web and Web-AP servers 34 and 38. In user information, included in the so issued service generation request, there are included information on a contract, such as the name, address, age or address of the user, and information on authentication required at the time of using the system. In general, the request for execution of "service generation" is made using the graphical user interface (GUI) provided by the Web server 34 and is displayed on the Web browser 50.

The appropriate one of the Web and Web-AP servers 34 and 38 responds to the "request for service generation" (Gen._REQ. 140) thus sent from the Web browser 50 and generates a boot signal (launching) 142 to the proxy UA generating accessor 104. The Web server 34 or the Web-AP server 42, thus having responded, sends out the generated boot signal (launching) 142, at a timing T12, to the service proxy UA manager 98.

The service proxy UA manager 98 responds to the boot signal 142 and uses the component AP interface 134 to enable the proxy UA generating accessor 104. The proxy UA generating accessor 104 generates a boot signal 144 for booting the cooperative manager 96. The boot signal 144 includes a request signal (Gen._REQ.) for accessing the proxy UA generator 62 of the SIP system 12 from within the Web system 14. The proxy UA generating accessor 104 at a timing T14 outputs the boot signal 144 to the cooperative manager 96.

The cooperative manager 96 is booted responsive to the boot signal 144. In transmitting the information to the SIP system 12 for this booting, the cooperative manager 96 selects one of the protocols, SOAP or CORBA, and generates, using the so selected communication protocol, a proxy UA generating access request (Gen._REQ. 146), inclusive of the information "access request". The cooperative manager 96 at a timing T16 sends out a proxy UA generating access request 146 to the cooperative manager 58, present in a different domain on the network 16, by way of communication. The cooperative manager 58 receives the proxy UA generating access request 146 from the cooperative manager 96 to generate a boot signal 148 for booting the proxy UA generator 62. In the boot signal 148 is included the "proxy UA access request" information. The cooperative manager 58 outputs the boot signal 148 at a timing T18 to the proxy UA generator 62 of the service proxy UA manager 54.

The proxy UA generator 62 is responsive to the boot signal 148 to generate a proxy user agent and also generates a boot signal 150, which is output at a timing T20 to the proxy UA registrar 64. With the booting, the proxy UA registrar 64 at a timing T22 registers the proxy UA information in the SIP database 24 which is managed by one of the SIP-AP and SIP servers 26 and 22 (Registration 152).

The SIP database 24 carries out retrieval, based on the registered proxy UA information, and outputs the result of retrieval (Result) 154 at a timing T24 to the proxy UA generator 62. The result of the retrieval is SIP-URI (Uniform Resource Identifier) information generated. The proxy UA generator 62 receives the retrial result to generate a boot signal 156 inclusive of the retrial result. The boot signal 156 boots the cooperative manager 58. The service proxy UA manager 54 at a timing T26 outputs the boot signal 156 to the cooperative manager 58.

The cooperative manager 58 is started with the boot signal 156. In returning the SIP-URI information generated of the result of retrieval, the cooperative manager 58 selects one of the protocols, SOAP or CORBA, to use the thus selected communication protocol. Using this communication protocol selected, the cooperative manager 58 transmits the result of the "service generation request", in the form of proxy UA generating response (Gen._RES.) 158, to the cooperative manager 96. The cooperative manager 96 receives the result of the "service generation request". The cooperative manager 96 at a timing T30 outputs a response signal (Response) 160, inclusive of the result, to the proxy UA generating accessor 104. This proxy UA generating accessor 104 receives the result of the execution of the component AP interface 134 of the service proxy UA manager 98 and, at a timing T32, outputs a response signal 162 to one of the Web and Web-AP servers 34 and 38 as the execution result. The result of execution is user information data obtained on the retrieval on the SIP database 24 (SIP-URI information generated).

The appropriate one of the Web and Web-AP servers 34 and 38 processes the results of retrieval of the user information in a form that can be displayed on the Web client. This form that can be displayed may, for example, be the SIP-URI form. The one server forwards, at a timing T34, the processed data (Service_INF) 164 to the Web browser 50 which originated the "service generating request". The Web browser 50 displays the result of the "service generating request".

The operation for presence setting will be described with reference to FIGS. 6A and 6B. The Web browser 50 at a timing T40 issues a request for execution of "Service Presence Setting" (Set_REQ.) 170 as a presence setting request. This execution request is equivalent to the designation of SIP-URI. In the request for execution of "Service Presence Setting" is included user information. In the user information are included information on a contract, such as the name, residence, age and address of the user, and information required for authentication at the time of using the system. In the request information for service presence setting, there are included contents representing service states, such that states are specified. These states include "execution waiting", "under processing" and "end", which are set as the presence. In general, the information setting in the "service presence setting" is made using the GUI provided by the Web server 34 and is displayed on the Web browser 50. The Web browser 50 sends out "service presence setting" 170 to one of the Web and Web-AP servers 34 and 38.

The appropriate one of the Web and Web-AP servers 34 and 38 generates a boot signal 172, based on a request for executing the "service presence setting" supplied thereto. The boot signal 172 is sent at a timing T42 to the service proxy UA manager 54. The service proxy UA manager 54 responds to the boot signal 172 and uses the enclosed component AP interface 134 to activate the presence setting accessor 110. The presence setting accessor 110 generates a boot signal 174, inclusive of the information on the presence setting, to send the signal at a timing T44 to the cooperative manager 96.

The cooperative manager 96 is booted upon receipt of the boot signal 174. In this booting, the cooperative manager 96 selects one of the protocols, SOAP or CORBA, in transmitting the information to the SIP system 12, and uses the so selected communication protocol to generate a presence setting access request (Set_Req.) 176, inclusive of the information "presence setting request". The cooperative manager 96 at a timing T46 sends the presence setting access request 176 to the cooperative manager 58, present in a different domain on the network 16, by way of communication.

The cooperative manager 58 receives a presence setting access request 176, supplied from the cooperative manager 96, to generate a boot signal for booting the presence setting function 68. In the boot signal is included the "presence setting access information". The cooperative manager 58 at a timing T48 outputs a boot signal 178 to the presence setting function 68 of the service proxy UA manager 54.

The presence setting function 68 is booted responsive to the boot signal 178. By this booting, the presence setting function 68, as a proxy user agent, accesses the SIP database 24 to update or change the setting of the presence information in the SIP database 24 with the presence information included in the boot signal 178 (Change 180). The SIP database 24 is managed by at least one of the SIP-AP and SIP servers 26 and 22.

After this updating, the proxy UA information retrieving function 74, not shown in FIG. 7, is booted, and retrieves the SIP database 24. This SIP database 24 at a timing T52 outputs the result of the retrieval of the presence information to the proxy UA information retrieving function 74 (Response 182). The proxy UA information retrieving function 74 sends the results of retrieval of the presence information, supplied thereto, to the presence setting function 68.

The presence setting function 68 notifies the updating or change of the presence information, registered in the SIP database 24, in, e.g. the SIP softphone 46. This change notification is the sequence of retrieval processing, carried out as from the time T52. A number of retrieval processing sequences, equal to the number of watchers, are carried out asynchronously (Notify 184a).

The service proxy UA manager 54 at a timing T54 sends a boot signal 184, inclusive of the retrieved results, to the cooperative manager 58, for booting. The cooperative manager 58 uses one of the protocols, SOAP or CORBA, to have communication with the cooperative manager 96 at a timing T96 (Response 186). The cooperative manager 96 at a timing T58 sends a response signal 188 to the presence setting accessor 110 of the service proxy UA manager 98. The response signal 188 includes the results of "presence setting request", such that, if the usual setting is successful, the contents of the presence as set are transmitted as a status of 'execution waiting'. If the setting has resulted in failure, the response signal 188 is transmitted representative of NG (No good).

The presence setting accessor 110 in the service proxy UA manager 98 sends out, at a timing T60, the result of the execution of the component AP interface 134 to the Web server 34 or to the Web-AP server 38 (Response 190). The results of the execution represent user information data obtained by the retrieval in the SIP database 24. The appropriate one of the Web and Web-AP servers 34 and 38 sets the results to a displayable form. The form may, for example, be the SIP-URI. The one server delivers, at a timing T62, the results of "service presence request", that is, a service presence (Service_Presence) 192, to the requesting Web browser 50, for display thereon.

By the above-described operation, the presence may be set in the SIP database 24 of the SIP system 12, in keeping with a presence setting request from the Web browser or from the Web client, and the presence setting state on the SIP database 24 may readily be sent to the requesting client in the form of response signal.

The operation of message transmission in the communication system 10 will now briefly be described with reference to FIGS. 7A and 7B. The constituent elements involved are the same and designated with the same reference numerals.

The Web browser 50 at a timing T70 issues a request for execution of "message transmission" (Send_REQ.) 200 to one of the Web and Web-AP servers 34 and 38. The user information and the GUI handled here are the same as those in the foregoing description on the operation. The appropriate one of the Web and Web-AP servers 34 and 38 generates a boot signal 202, based on a "message transmission request" (Send_REQ.) 200, and sends the boot signal 202 at a timing T72 to the message transmission accessor 112. The boot signal 202 uses the component AP interface 134 to boot the message transmission accessor 112.

The message transmission accessor 112 at a timing T74 boots the cooperative manager 96 (launching 204). The cooperative manager 96 at a timing T76 uses one of the protocols, SOAP or CORBA, to communicate with the call attempt manager 58 present in a different domain on the network 16. The call attempt manager 58 receives a "message transmission request" (Send_REQ.) 206. The call attempt manager 58 at a timing T78 boots the message transmission function 70 (launching 208).

The message transmission function 70 at a timing T80 sends a message (Message) 210 to the SIP softphone 46, serving as a SIP client, for demonstration on a monitor. The SIP client corresponds to a message recipient. The message transmission function 70 receives a message response from the SIP softphone 46, in a manner not specifically shown. The message transmission function 70 at a timing T82 sends a boot signal 212, including the response contents, for booting.

The call attempt manager 58 utilizes one of the protocols, SOAP or CORBA, for sending a response of the result of transmission, and communicates with the cooperative manager 96 at a timing T84 (Response 214). The cooperative manager 96 receives the results of "message transmission request" issued by the Web browser 50. The cooperative manager 96 receives the results of "message transmission request" issued by the Web browser 50. The cooperative manager 96 at a timing T86 sends the received results to the information editor 88 of the generator 76 (Response 216).

The message transmission accessor 112 receives the results of "message transmission request", supplied thereto, to send the received results to one of the Web and Web-AP servers 34 and 38, at a timing T88, as the execution result (Response 218). The one server processes the results of the message transmission request to a displayable form. This displayable form may, for example, be the SIP-URI form. The one server provides at a timing T90 the Web browser 50 with a response signal (Response 220). The Web browser 50 displays the results of "message transmission request" on a monitor.

By the above-described operation, the service proxy UA managers 54 and 98 and the cooperative managers 58 and 96 are used to track the services on the Web to notify a message from one to another component system involved in the communication system 10 to send the results of notification to the source of transmission. Since the HTTP transactions are not reserved for a prolonged time period, it is possible to exploit resources more efficaciously, and to implement a user interface, as a practical application, more readily.

The operation will now be described in order of generating a call attempt, setting statuses, and notifying changes in the statuses and stagnant statuses.

Figure 8A:
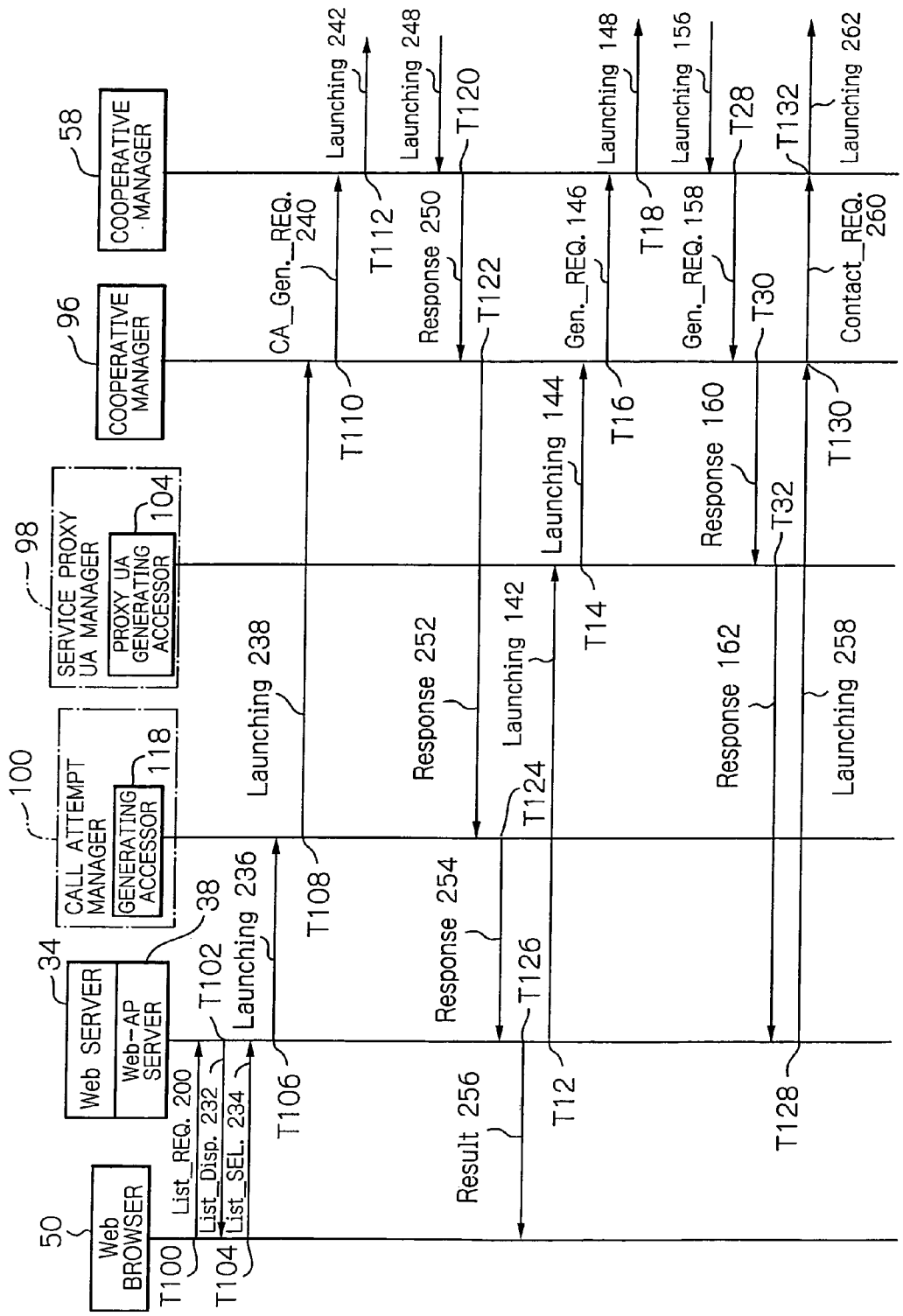

The generation of a call attempt will now be described, referring to an operational sequence of FIGS. 8A and 8B. The Web browser 50 initiates communication for achieving an objective. Before this initiation, the Web browser 50 at a timing T100 issues a contact list request (List_REQ. 230) to one of the Web and Web-AP servers 34 and 38.

On receipt of this contact list request, the appropriate one of the Web and Web-AP servers 34 and 38 at a timing T102 outputs a contact list, indicative of plural candidates for a called party under communication, to the Web browser 50, as a response to the request (List_Disp. 232). Upon receipt of the contact list by the Web browser 50, the contact list thus supplied is displayed on a Web page. In the contact list, there is included information such as the name, telephone number and presence of destinations for communication.

The user at a timing T104 selects an intended item, displayed on the Web browser 50, as a contact destination (List_SEL.234). This will execute transmission. In this manner, in general, a new item is transmitted from an objective-wise Web page to initiate communication.

One of the Web and Web-AP servers 34 and 38 generates a boot signal 236, including the information on the "select contact list" (List_SEL. 234) supplied. The boot signal 236 is output at a timing T106 to the call attempt manager 100. The call attempt manager 100 uses the corresponding component AP 136 in response to the boot signal 236, and boots the generating accessor 118 accordingly.

The generating accessor 118 generates a boot signal 238, including the information on a contact list selection for the cooperative manager 96. The generating accessor 118 at a timing T108 outputs the boot signal 238 to the cooperative manager 96. The cooperative manager 96 is booted responsive to the boot signal 238.

In transmitting the information to the SIP system 12, in this booting, the cooperative manager 96 selects either one of the protocols, SDOAP or CORBA, and generates, using the thus selected communication protocol, a request (CA_Gen._REQ.) 240, inclusive of the information "Request for generating a call attempt". The cooperative manager 96 at a timing T110 sends a request inclusive of the information "Request for generating call attempts" 240 to the cooperative manager 58 present in a different domain on the network 16.

The cooperative manager 58 generates a boot signal for the generator 76 of the call attempt manager 56. The cooperative manager 58 at a time T112 outputs a boot signal 242 to the generator 76. The boot signal 242 exploits the component AP interface 94 associated with the call attempt manager 56 to boot the generator 76. The generator 76 generates an instance of a call attempt associated with the task (Instance 244). The generator 76 at a timing T114 stores or registers the so generated instance 244 in the SIP database 24. This SIP database 24 at a timing T116 outputs a response signal (Response) 246 to the registration to the generator 76.

Upon receipt of the response signal 246 from the SIP database 24, the generator 76 becomes aware of the completion of the call attempt generation. Responsive to this completion, the generator 76 generates a boot signal 248 for booting the cooperative manager 58. The generator 76 at a timing T118 outputs the boot signal 248 to the cooperative manager 58. The cooperative manager 58 is booted responsive to the boot signal 248.

For returning the result of the transmission to the call attempt manager 100, the cooperative, manager 58 exploits one of the communication protocols, SOAP or CORBA. The cooperative manager 58 at a timing T120 communicates with the cooperative manager 96 to transmit a response signal 250. The cooperative manager 96 at a timing T112 outputs the result of "call attempt generating request" (Response) 252, obtained by communication with the cooperative manager 58, to the generating accessor 118.

The call attempt manager 100 at a timing T124 returns the results received by the generating accessor 118, as the execution result of the component AP interface 94, to one of the Web and Web-AP servers 34 and 38. The appropriate one of the Web and Web-AP servers 34 and 38 processes or reforms the received result to a form capable of displaying that the relevant contact destination has been selected. A displayable indication may be by an inverted item.

The appropriate one of the Web and Web-AP servers 34 and 38 outputs the result (Result) 256 of "contact list selection", processed at a timing T126, to the Web browser 50, which then visualizes the result 256 supplied thereto.

Figure 5A:
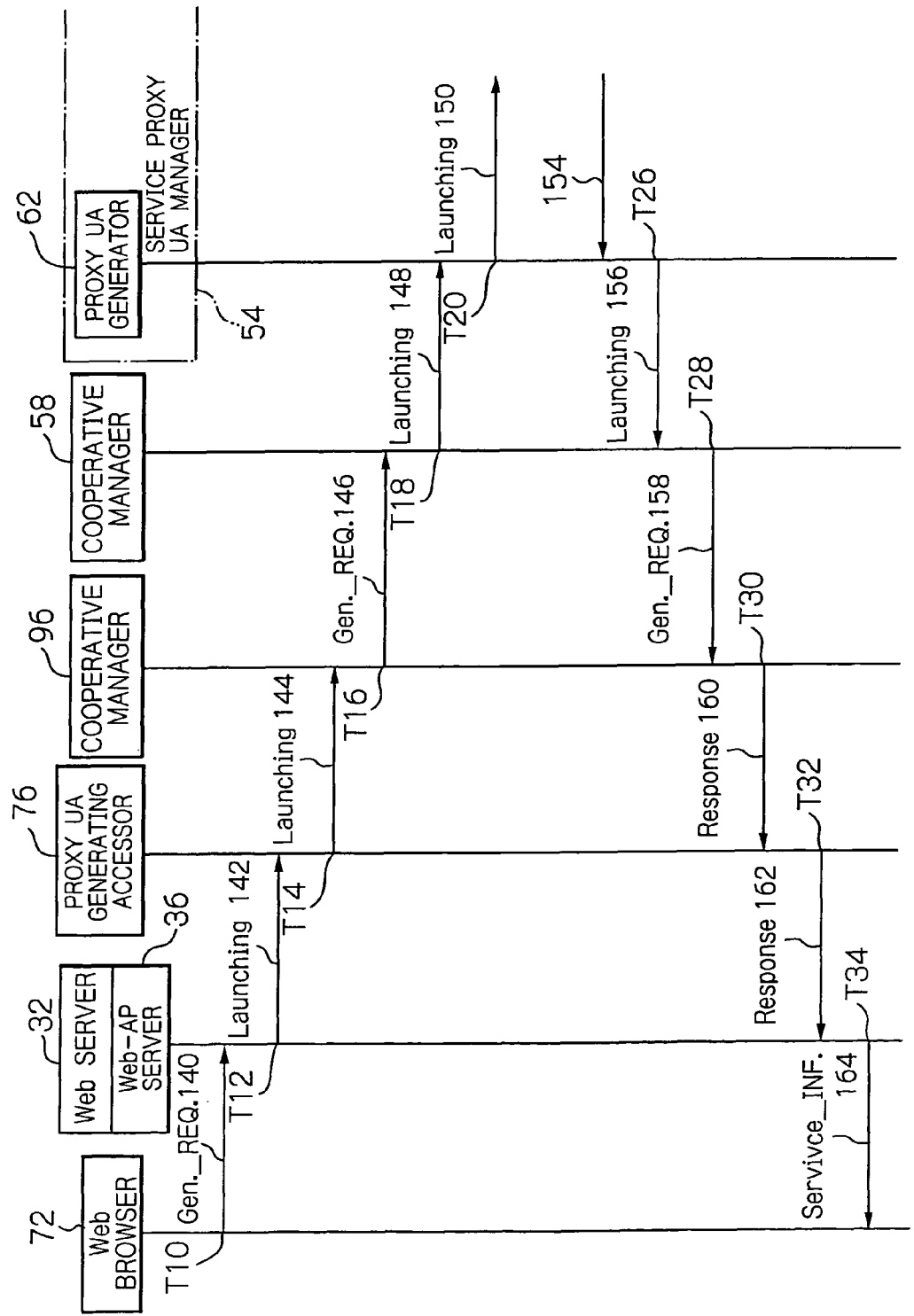

In the operating sequence for the proxy UA generation, the operational sequence from timing T12 to timing T32, shown in FIG. 5A, is then continuously executed. The operation then proceeds towards communication establishment. One of the Web and Web-AP servers 34 and 38 at a timing T128 generates a boot signal 258 for the cooperative manager 96. The boot signal 258 includes the request information for "call establishment" in the one server. The request information for "call establishment" is a request for "call establishment" between, e.g. the SIP client 46 of the contact selection destination and the SIP client 48 as a user. The cooperative manager 96 at a timing T130 uses the selected communication protocol and sends a request for "call establishment" (Contact_REQ.) 260 to the cooperative manager 58.

The cooperative manager 58 at a timing T132 generates a boot signal 262, inclusive of the request information for "call establishment". The cooperative manager 58 at a timing T132 outputs the boot signal 262 to one of the SIP-AP and SIP-AP servers 26 and 22. The appropriate one of the SIP-AP and SIP-AP servers 26 and 22 is responsive to the boot signal 262 and exploits the sequence of 3PCC (3rd entity call control) to transmit at a timing T134 a call control signal (call_CON.) 264, to the SIP client 46 serving as a contact selection destination. The appropriate one of the SIP-AP and SIP-AP servers 26 and 22 similarly transmits a call control signal 266 to the SIP client 48, as a result of which a call is established between the SIP clients 46 and 48.

By the above-stated operation, the communication system 10 automatically generates, simultaneously with the transmission, a proxy user agent which notifies a call attempt associated with a task and changes in the status of the task, while establishing the communication.

Figure 9B:
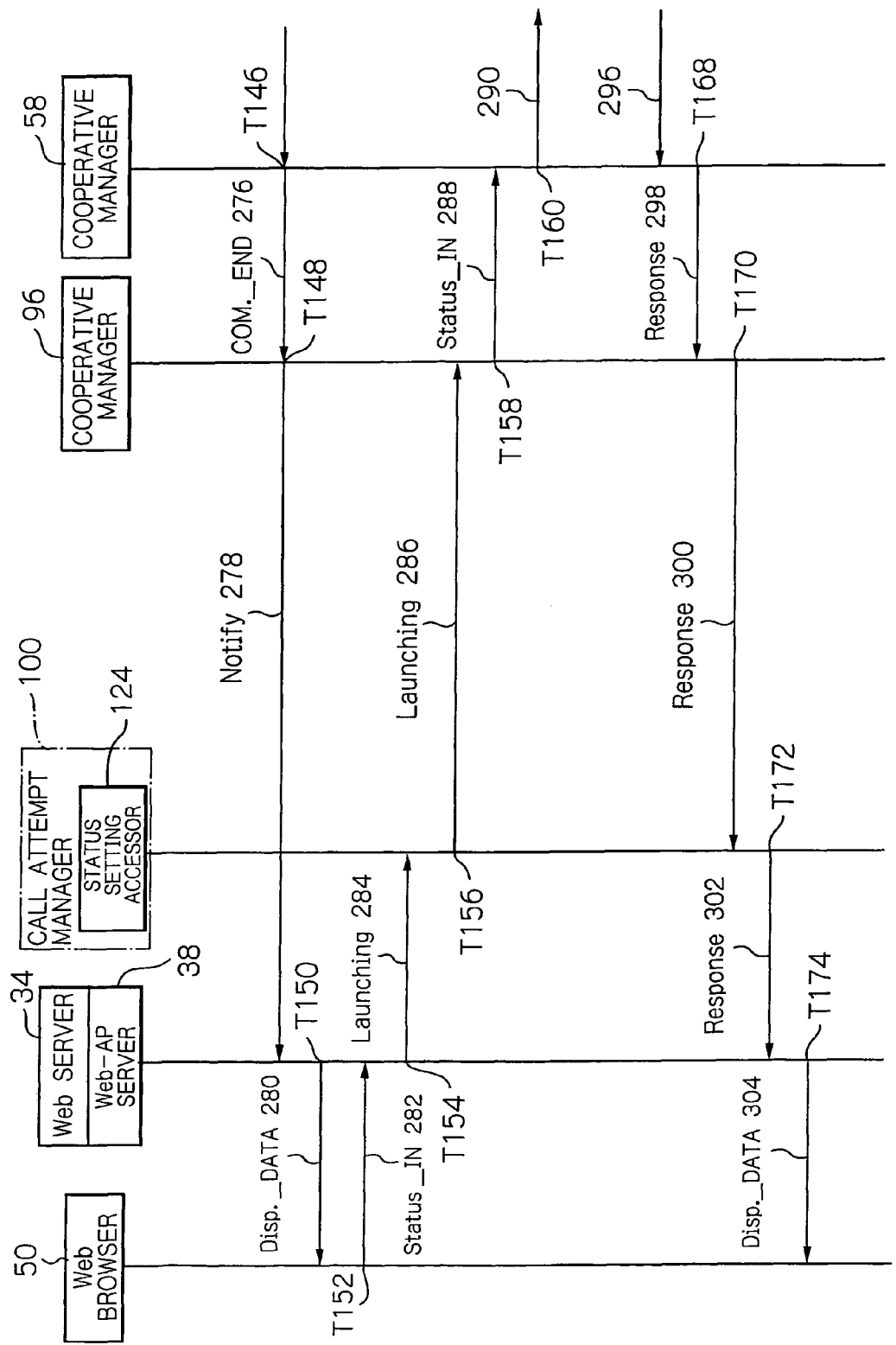

The operation of a status setting call attempt generation will now be described with reference to FIGS. 9A and 9B. First, the SIP client 48 in the course of communication performs a disconnection operation at a timing T140. This causes the information "call disconnection (Call_CUT 270)" to be transmitted to one of the SIP-AP and SIP servers 26 and 22. The appropriate one of the SIP-AP and SIP-AP servers 26 and 22 at a timing T142 transmits the fact of disconnection (Call_CUT 272) to the SIP client 46 as a counterpart entity on the communication. This permits the SIP clients 46 and 48 to terminate the communication.

Simultaneously, the appropriate one of the SIP-AP and SIP servers 26 and 22 generates a boot signal 274 which boots the cooperative manager 58 and includes information on call termination. The one server at a timing T144 outputs the boot signal 274 to the cooperative manager 58. This cooperative manager 58 uses the communication protocol selected and at a timing T146 (COM._END 276) imparts the fact of communication termination to the cooperative manager 96. The cooperative manager 96 at a timing T148 notifies the fact of "call termination" between the SIP client 46 as the contact selection destination and the SIP client 48 as a user to the appropriate one of the Web and Web-AP servers 34 and 38 (Notify 278).

The appropriate one of the Web and Web-AP servers 34 and 38 at a timing T150 sends data of the "status input picture" (Disp._DATA) 280 to the Web browser 50 for display thereon. This display prompts the user to input the data of his or her task. The user inputs data on how the immediately preceding communication has caused the target of the task to change its status. The Web browser 50 outputs an input status (Status_IN) 282 to either one of the Web and Web-AP servers 34 and 38.

The appropriate one of the Web and Web-AP servers 34 and 38 generates a boot signal 284 inclusive of the "status contents (Status_IN) 282" supplied thereto. The one server at a timing T154 outputs the boot signal 284, thus generated, to the call attempt manager 100, which in turn uses the enclosed component AP interface 136 to drive the status setting accessor 124.

The status setting accessor 124 generates a boot signal 286 for the cooperative manager 96. The status setting accessor 124 at a timing T156 outputs a boot signal 286 including the "status content". The cooperative manager 96 is booted responsive to the boot signal 286.

The cooperative manager 96 selects one of the communication protocols, SOAP or CORBA, in order to transmit the information (Status_IN) to the call attempt manager 56. The cooperative manager 96 at a timing T158 uses the selected protocol (Status_IN 288) to communicate with the cooperative manager 58, included in a distinct domain on the network.

The cooperative manager 58, through the communication with the cooperative manager 96, receives the "status content" issued by the status setting accessor 124. The cooperative manager 58 generates a boot signal 290 for booting the status setting function 82 in the call attempt manager 56. The cooperative manager 58 at a timing T160 sends the boot signal 290 to the call attempt manager 56.

The status setting function 82 at a timing T162 outputs a command for renewing the appropriate value in the SIP database 24 with a status value of the call attempt associated with the task (Change 292). The SIP database 24 changes or updates the status value responsive to the command. The cooperative manager 58 at a timing T164 outputs a response signal 294, meaning the end of status setting, to the status setting function 82. On receipt of the signal indicating the end of the status setting, the status setting function 82 generates a boot signal 294 for the cooperative manager 58. The status setting function 82 at a timing T166 outputs the boot signal 294, inclusive of the completion information, to the cooperative manager 58.

On receipt of a boot signal 296, the cooperative manager 58 at a timing T168 feeds the cooperative manager 96 with a response signal 298. For returning the setting result to the call attempt manager 100, during sending the boot signal, the cooperative manager 58 selects and uses one of the communication protocols, SOAP or CORBA, in order to communicate with the cooperative manager 96. This cooperative manager 96 at a timing T170 outputs a response signal 300, obtained by communication, to the status setting accessor 124. The response signal 300 is indicative of the setting result of the "status content" issued by the status setting accessor 124.

On receipt of the setting result of the "status content", the status setting accessor 124 at a timing T172 returns the result, as an execution result of the component AP interface 136, to one of the Web and Web-AP servers 34 and 38 (Response 302). The appropriate one of the Web and Web-AP servers 34 and 38 converts the execution result into a form capable of displaying that a user-specified status has been set. This form is, e.g. a setting-confirming message type of display. The appropriate one server sends data of the form processed at a timing T174 (Disp._DATA) 304 to the Web browser 50 as the result of "status input" at timing T152. The Web browser 50 displays the result of "status input" thereon.

Responsive to the end of the communication, a status input page is displayed on the Web browser 50 as continued from the establishment of the call, in order to have the user input to which status the communication has changed in terms of the target for the task. This changes will cause the status of the call attempt to be updated. The user may be apprized of the result of the change on the Web browser 50.

Figure 10B:
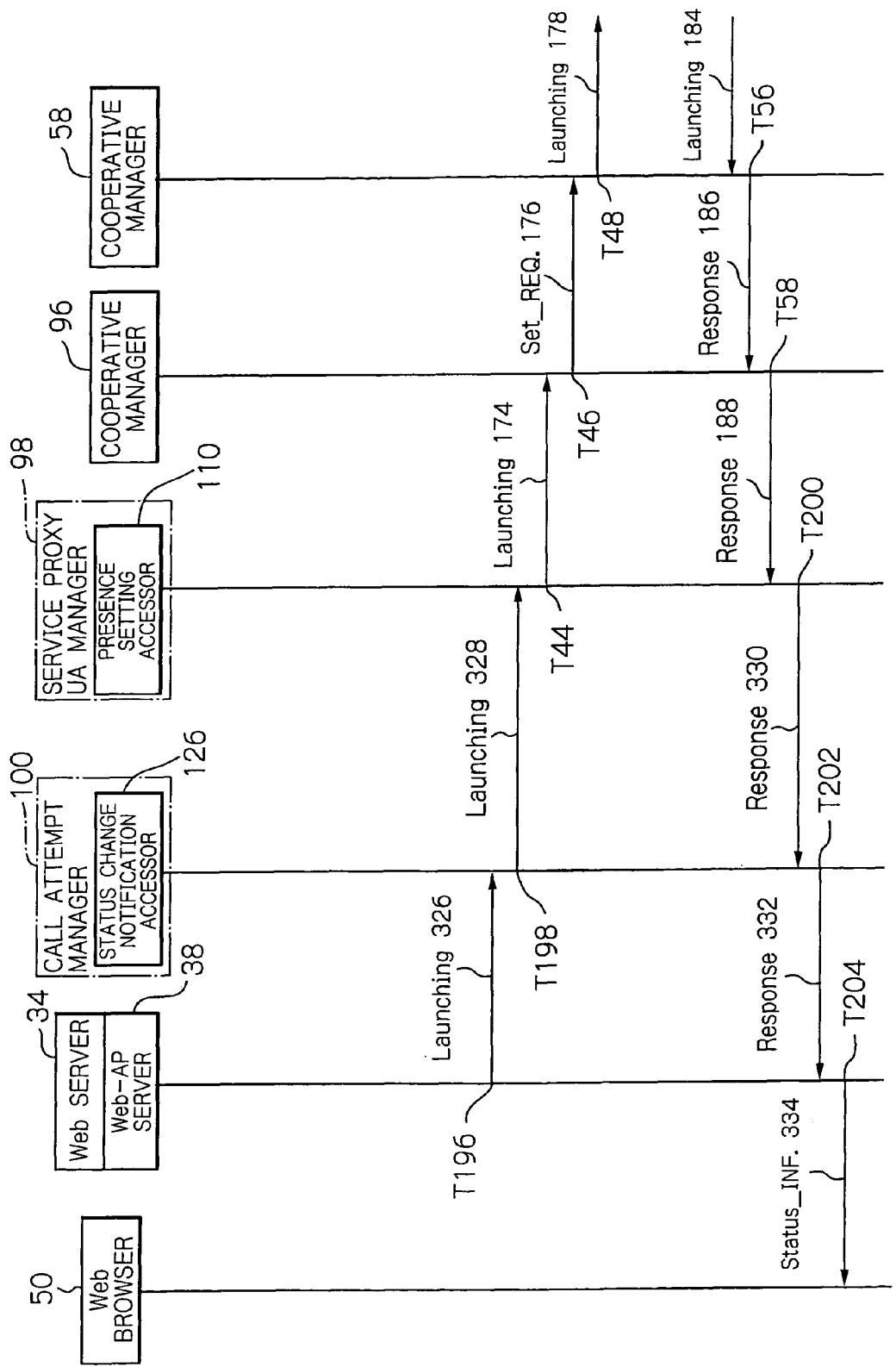

Well referring to FIGS. 10A and 10B, the operation will be described of the notification of the status change. First, a user, involved in a task, at timings T180 and T182 uses the SIP clients 46 and 48 and supplies one of the SIP-AP and SIP servers 26 and 22 with "requests for notification of status change (Change_REQ. 310 and 312)", in order to notify the change in the status. The appropriate one of the SIP-AP and SIP servers 26 and 22 is responsive thereto and, at timings T184 and T186, registers in the SIP database 24 the SIP clients 46 and 48, as destinations of the presence notification of the proxy user agent associated with the task (Registrations 314 and 316, respectively). The SIP database 24 at timings T188 and T190 sends the results of registration (Responses 318 and 320, respectively) to one of the SIP-AP and SIP servers 26 and 22. The appropriate one server sends the results of registration 322 and 324 to the SIP clients 46 and 48, respectively, as the results of confirmation of the "requests for notification of status change".

After having transmitted the requests for notification in that way, the state of the task is changed in one of the Web and Web-AP servers 34 and 38, by, e.g. the operation of status setting. This state change means the change in the status of the call attempt. The appropriate one server exploits the scheme of the presence of the corresponding proxy user agent and notifies the SIP clients 46 and 48, having made the request, of the status change.

In the event of the status change, the appropriate one of the Web and Web-AP servers 34 and 38 is responsive to the changed status contents and exploits the component AP interface 136 in the call attempt manager 100 to generate, at a timing T196, a boot signal 326 for booting the status change notification accessor 126. The one server produces at a timing T196 the boot signal thus generated.

The status change notification accessor 126 replaces the status contents by the presence contents of the proxy UA and generates, using the component AP interface 134 in the service proxy UA manager 98, a boot signal for booting the presence setting accessor 110. The status change notification accessor 126 develops, at a timing T198, a boot signal 328. The operation as from the timing T44 to the timing T58, shown in FIGS. 6A and 6B, will then be carried out in order. It is noted that the SIP database 24 at the timings T51a and T51b notifies the change to the SIP clients 46 and 48, respectively. The change processing is the retrieving processing sequence and is carried out asynchronously a number of times equal to the number of the watchers (Notify 184a and 184b).

The next operation is supplying the presence setting accessor 110 with a response signal 188 for a timing T58, which is the result of the presence notification. The presence setting accessor 110 at a timing T200 returns a response signal 330, as the execution result of the component AP interface 134 in the service proxy UA manager 98, to the status change notification accessor 126.

The status change notification accessor 126 at a timing T202 returns the result of the execution (Response 332) in the component AP interface 136 of the call attempt manager 100 to one of the Web and Web-AP servers 34 and 38. The appropriate one of the Web and Web-AP servers 34 and 38 at a timing T204 sends out the processed result of execution (Status_INF.) 334 to the Web browser 50, which will in turn display the results of execution 334 on its viewing screen, now shown.

When the status of the call attempt has, under the situation caused by the task, been changed in this manner, one of the Web and Web-AP servers 34 and 38 exploits the scheme of the presence of the corresponding proxy user agent to notify the fact of the status change to the SIP clients 46 and 48 that made the request for notification of the status change. The status change of the call attempt is notified to all the SIP clients having made notification requests at the outset. No notification is made to SIP client or clients not made such a request.

The operation of notification of a stagnant state will now be described with reference to FIG. 11. At first, the operation will proceed in the same way as that of the timings T180 through T194 shown in FIG. 10A. The same operation will cause the SIP clients 46 and 48 to be the destination of stagnant notification.

Then, one of the Web and Web-AP servers 34 and 38 is monitoring the status change notification accessor 126 of the call attempt manager 100. If there is found no change in the status change notification accessor 126 until the lapse of a predetermined time, the one server exploits the scheme of the presence of the relevant proxy user agent and notifies status changes to the SIP clients 46 and 48 having made the request. The predetermined time is, e.g. one hour, and may be set on a system basis from one status to another.

If one of the Web and Web-AP servers 34 and 38 has found a task which is in the stagnant state until the lapse of the predetermined time, one of the Web and Web-AP servers 34 and 38 exploits the component AP interface 136 in the call attempt manager 100 and generates a boot signal 340 for the stagnant state notification accessor 128. The one server at a timing T210 outputs the boot signal 340, thus generated, to the stagnant state notification accessor 128. This stagnant state notification accessor 128 is booted responsive to the boot signal 340.

The stagnant state notification accessor 128 replaces the presence content of the proxy user agent, pertinent to the stagnant call attempt, by a message for alarm of the stagnant state, and generates a boot signal 342 for booting the presence setting accessor 110. The alarm message may preferably be a letter/character string, such as "please issue a command at once", for example.

The stagnant state notification accessor 128 at a timing T212 sends the boot signal 342 to the service proxy UA manager 98, which is responsive to the boot signal 342 and exploits the component AP interface 134 to be booted. The communication system 10 then continues the operation in such a manner that the operation of timings T44-T58, shown in FIGS. 6A and 6B, is carried out sequentially to notify a stagnant state alarm to the requesting SIP clients 46 and 48 to send a response signal 188 for a timing T58 indicating the result of presence notification to the presence setting accessor 110.

The presence setting accessor 110 at a timing T214 returns a response signal 344, as the execution result of the component AP interface 134 in the service proxy UA manager 98, to the stagnant state notification accessor 128.

The stagnant state notification accessor 128 at a timing T216 also returns the result of execution in the component AP interface 136 of the call attempt manager 100 (Response 346) to one of the Web and Web-AP servers 34 and 38. The appropriate one of the Web and Web-AP servers 34 and 38 at a timing T218 sends processed execution results (Status_INF.) 348 to the Web browser 50, which will then display the results 348, supplied thereto, on its viewing screen.

If the status is not changed until the lapse of a preset time, the Web and Web-AP servers 34 and 38 are able to issue a stagnant status alarm to the requesting SIP clients 46 and 48, respectively.

By the operation of the present embodiment, the applications provided on the Web and SIP systems 14 and 12 may cooperate with each other to enable the Web-VoIP cooperative type of applications to be constructed, executed and managed significantly readily. By using the call attempt managers 56 and 100 to perform plural communications through a communication task or business on the Web, it is possible to achieve monistic situation management from the perspective of achieving objectives.

The situation changes and prolonged stagnancy may also be tracked or traced to cause the presence to be changed on the SIP database 24 in the SIP system 12, depending on the progress of the situation, in order to make corresponding notifications. Since this eliminates the necessity for reserving the HTTP transactions for a prolonged period of time, it becomes readily possible to achieve efficacious utilization of resources and user interfaces as practical application.

An alternative embodiment of the communication system 10 according to the present invention will now be described with reference to FIG. 12. With the communication system 10 of the alternative embodiment, the SIP system 12 and a Web system are arranged on a common computer 350. Constituent elements common with the previous embodiment are designated with the same reference numerals and the corresponding description will be omitted for simplicity.

Figure 12:
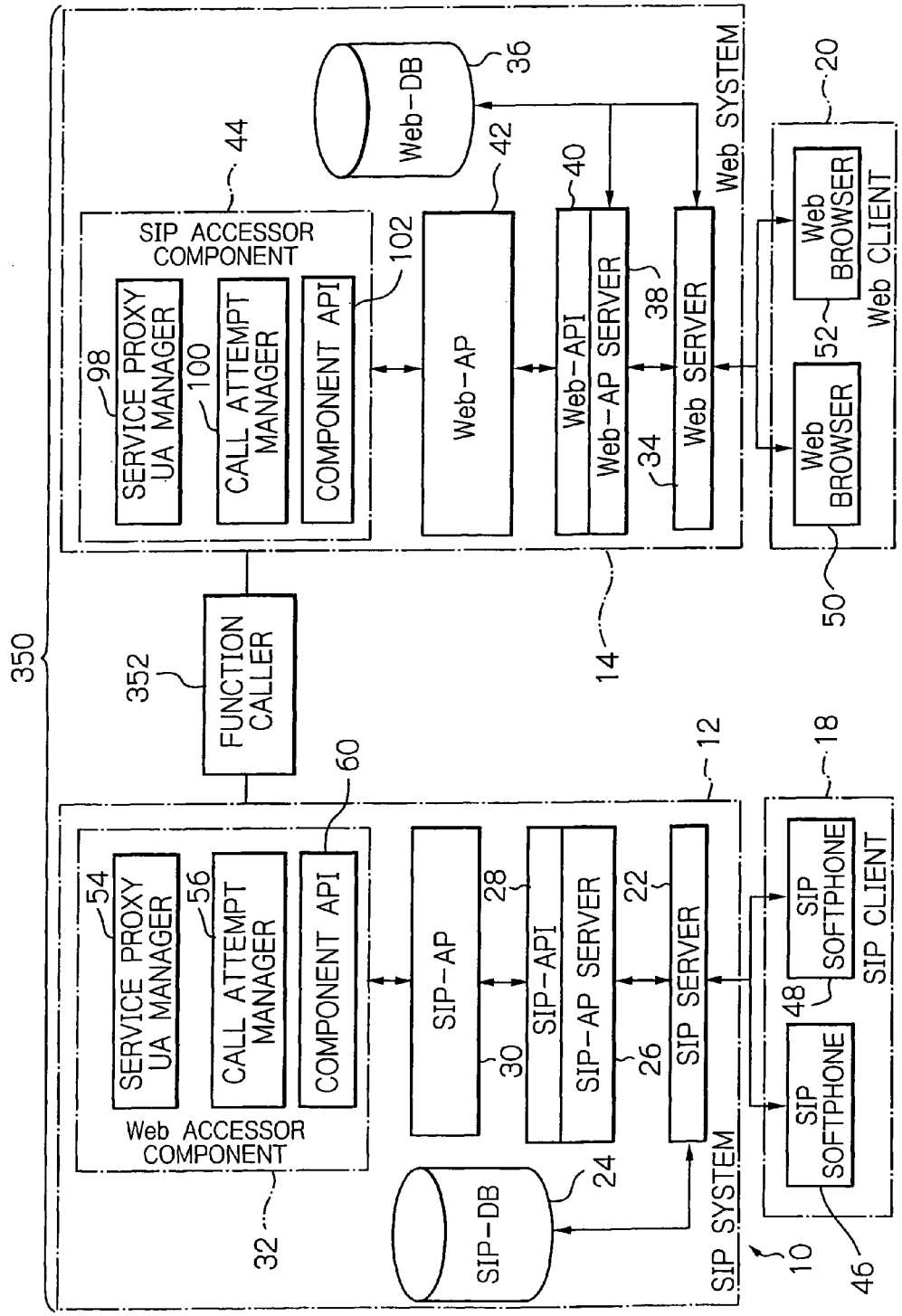
FIG. 12 is a schematic block diagram showing an alternative embodiment of the communication system.

The communication system 10 is connected by cooperative processes on the same computer, as seen from FIG. 12. As may be apparent from this connection, the network communication system 10 of the present embodiment is not on a network connection. Instead, the cooperative managers 58 and 96 shown in FIGS. 3 and 4 are not included in the system but both of the systems are interconnected to each other by a function caller 352, which plays the role of the cooperative management similar to that of the Web and SIP accessor components 32 and 44. The function caller 352 may be provided with program sequences employing a function callout on the C or C++ Language, or a method call of the Java (trademark). The operational sequence is similar to that of the previous embodiment.

With this structure, cooperation between applications installed on the Web and SIP environments may be achieved, as with the previous embodiment described above, and thereby the construction, execution and management of the Web-VoIP cooperative type of applications may be achieved remarkably readily. Moreover, in the present embodiment, in which the system is constructed on a sole computer environment, it is possible to achieve the cooperation between the Web and VoIP applications on the environment of a small-sized computer.

A further alternative embodiment of the communication system 10, embodying the present invention, will be described with reference to FIGS. 13 and 14. In the communication system 10 of the further alternative embodiment, the SIP system 12 and an FTP (File Transfer Protocol) system 400 are arranged on the network environments belonging to network domains different from each other. In addition, the SIP and FTP systems 12 and 400 may be arranged on a sole server computer or in a LAN environment within the same domain, as with the first embodiment shown and described with reference to FIGS. 2-4.

Figure 13:
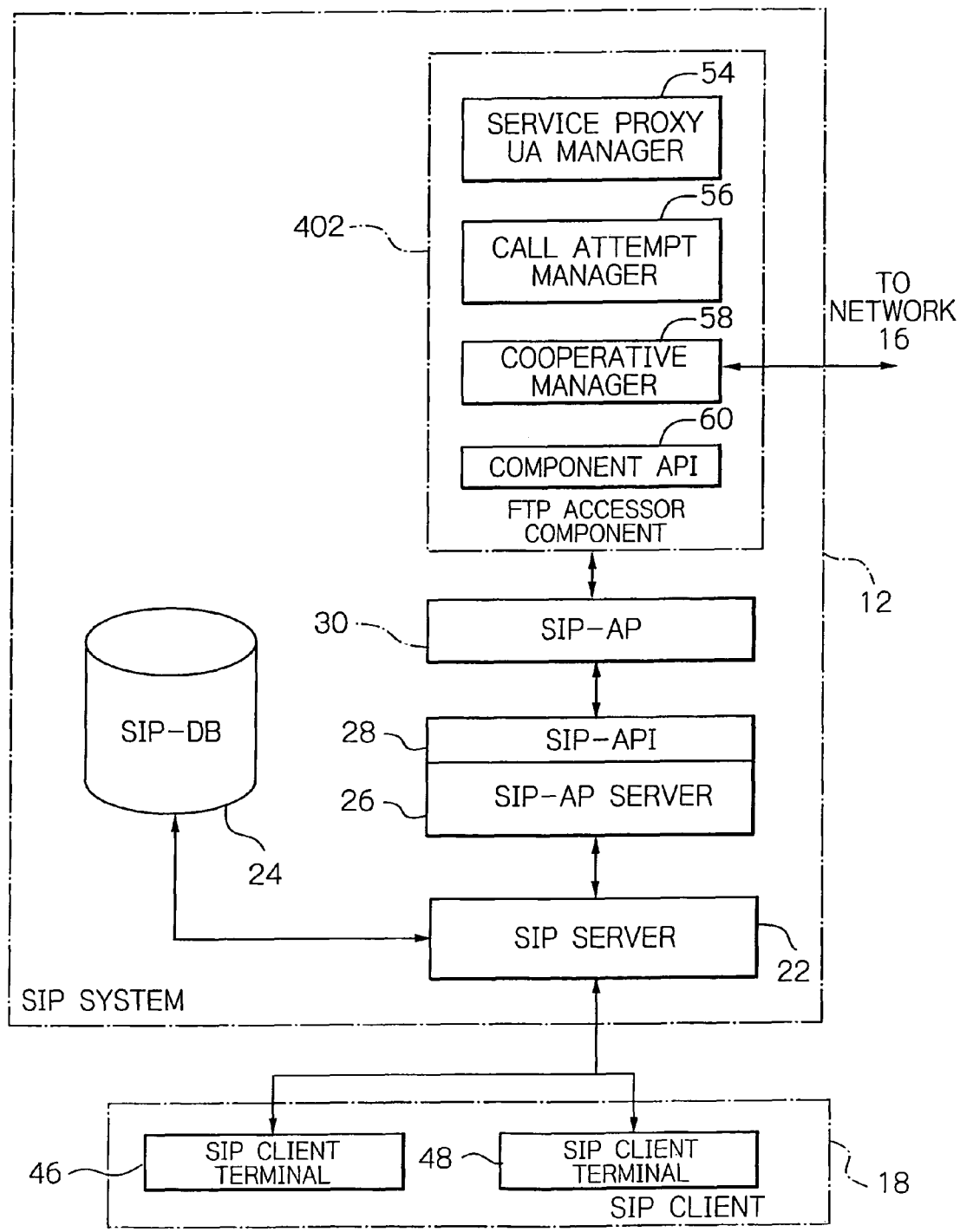
FIG. 13 is, like FIG. 2, a schematic block diagram showing an embodiment of a SIP environment in the alternative embodiment.

Referring to FIG. 13, the SIP system 12 is of the same structure as with the first embodiment, and hence the same reference numerals are used to omit a repeated description. Although the accessor component in the SIP system 12 is the same in function as the Web accessor component 32, it is designed to deal not with the Web but with the FTP, and hence the appellation of an FTP accessor component 402 is used.

Figure 14:
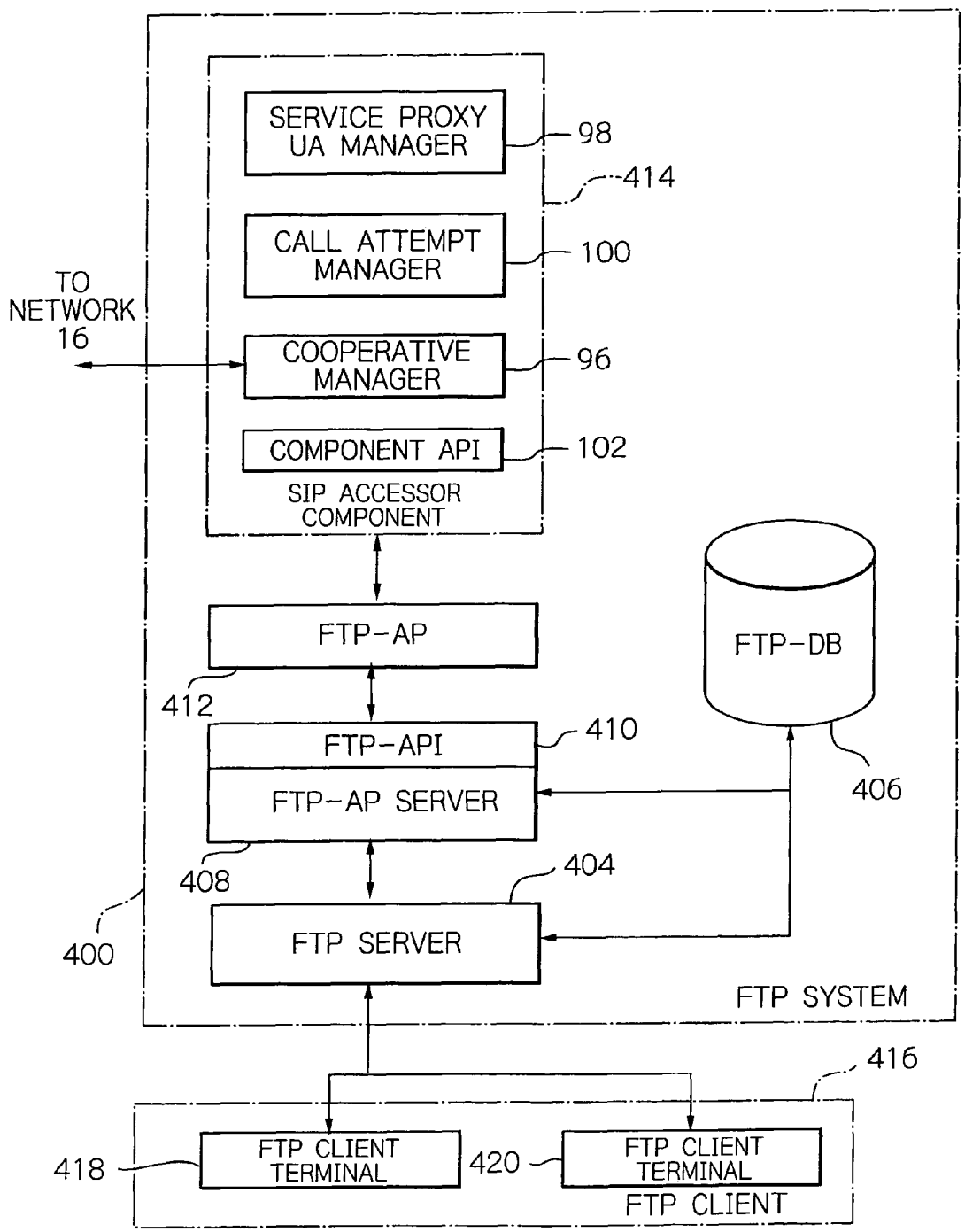
FIG. 14 is, like FIG. 4, a schematic block diagram showing an embodiment of an FTP environment in the alternative embodiment.

The other system, that is, the FTP system 400 shown in FIG. 14, includes an FTP server 404, an FTP database (FTP-DB) 406, an FTP application server (FTP-AP server) 408, an FTP application interface (FTP-API) 410, an FTP application (FTP-AP) 412, a SIP accessor component 414 and an FTP client 416, which are interconnected as illustrated. These component elements will now be described briefly.

The FTP server 404 is adapted for handling and managing an FTP protocol. The FTP database 406 is a storage device in which to store information managed by the FTP server 404 to function as a database. The information for storage is, e.g. file information transferred by the FTP protocol. The FTP-AP server 408 is adapted for running an application for operating an FTP protocol supervised by the FTP server 404. The FTP-AP interface 410 is an application interface provided by the FTP-AP server 408. The FTP application 412 is constructed by the FTP-AP interface 410 and executed on the FTP-AP server 408. The application may be exemplified by an application for file exchange or sharing on a peer-to-peer connection.

The SIP accessor component 414 is a generic name of a set of software components for the FTP application 412 to cooperate with the SIP system 12. The SIP accessor component 414 is the same as the SIP accessor component 44 of the Web system 14 described earlier, and includes the service proxy UA manager 98, call attempt manager 100, cooperative manager 96 and component AP interface 102. Those components are the same in function as with the first embodiment.

The FTP client 416 is interconnected to the FTP server 404, and is a client setup or adapted in an environment exploiting the functions provided by the FTP application 412. The FTP client 416 may be provided with plural FTP client terminals 418 and 420. The FTP client terminal 418 in general has its text display screen on which to enter a file transfer request and to display a file transfer result.

This structure makes it possible to construct an application whereby information obtained may be provided to a requesting client, despite the difference in the systems. Specifically, applications constructed on the FTP and SIP systems 400 and 12 may cooperate with each other to enable the FTP-VoIP cooperative applications to be constructed, executed and managed significantly readily. By this structure, information of the respective systems may be shared and utilized smoothly. A provision of various kinds of additional components on the FTP and SIP accessor components 402 and 414 renders it possible to extend the FTP-VoIP cooperative type of system. Increasing sorts of the SIP and FTP applications installed along with the sorts of components may implement a wide variety of FTP-VoIP cooperative type of applications.

Figure 15:
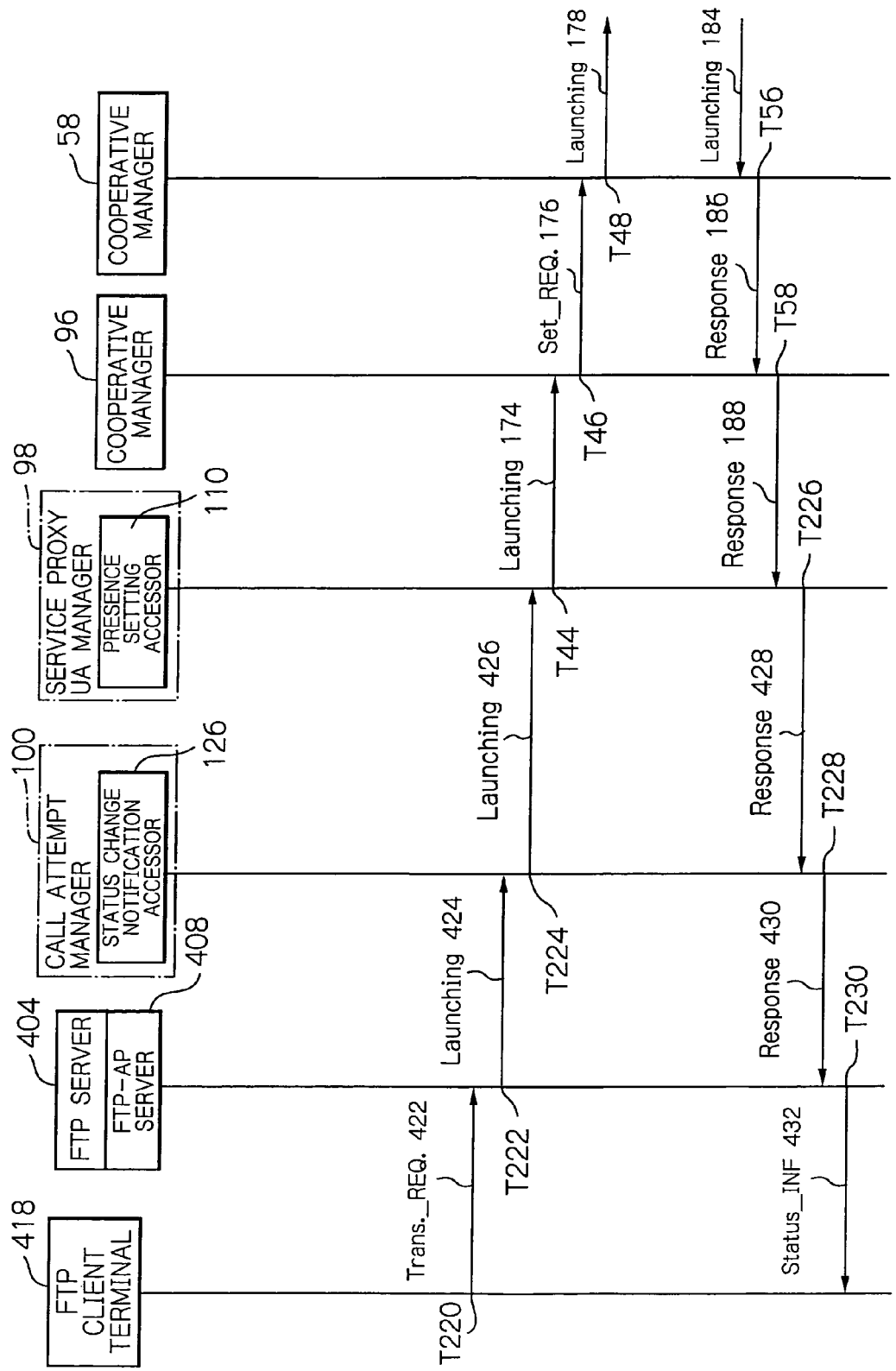
FIG. 15 is a sequence chart useful for understanding the operational sequence for notifying a status change by the call attempt in the FTP environment continuing from the processing shown in FIG. 10A.

The operation of the notification of status changes in the communication system 10 of the instant embodiment will now be described with reference to FIGS. 10A and 15. The notification of status changes proceeds in the same sequence of operations as at the timings T180-T194 shown in FIG. 10A. The sequence will then cause the SIP clients 46 and 48 to be a destination of the notification of the status changes.

The FTP client 418 at a timing T220 issues a "file transfer request" (Trans._REQ.) 422. The file content then becomes a new status content of a call attempt. One of the FTP and FTP-AP servers 404 and 408 are responsive to the "file transfer request" 422 received to execute file transfer. After the execution, the appropriate one of the FTP and FTP-AP servers 404 and 408 reads out an identifier of a call attempt changing the status and the contents of the new status from the contents of the transferred file. The one server generates a boot signal 424 for booting the status change notification accessor 126. One of the FTP and FTP-AP servers 404 and 408 at a timing T222 sends the boot signal 424 to the call attempt manager 100. In the boot signal 424 are included an identifier of the call attempt as read out and the information of the new status contents. The call attempt manager 100 uses the component AP interface 136 shown in FIG. 1 to boot the status change notification accessor 126.

The status change notification accessor 126 replaces the status contents by the presence contents of the proxy user agent. The status change notification accessor 126 generates a boot signal 426 for booting the presence setting accessor 110 of the service proxy UA manager 98 inclusive of the replaced presence contents. The status change notification accessor 126 sends the boot signal 426, generated at a timing T224, to the service proxy UA manager 98. This service proxy UA manager 98 receives the boot signal 426 and uses the component AP interface 134 to boot the presence setting access module.

Figure 6A:
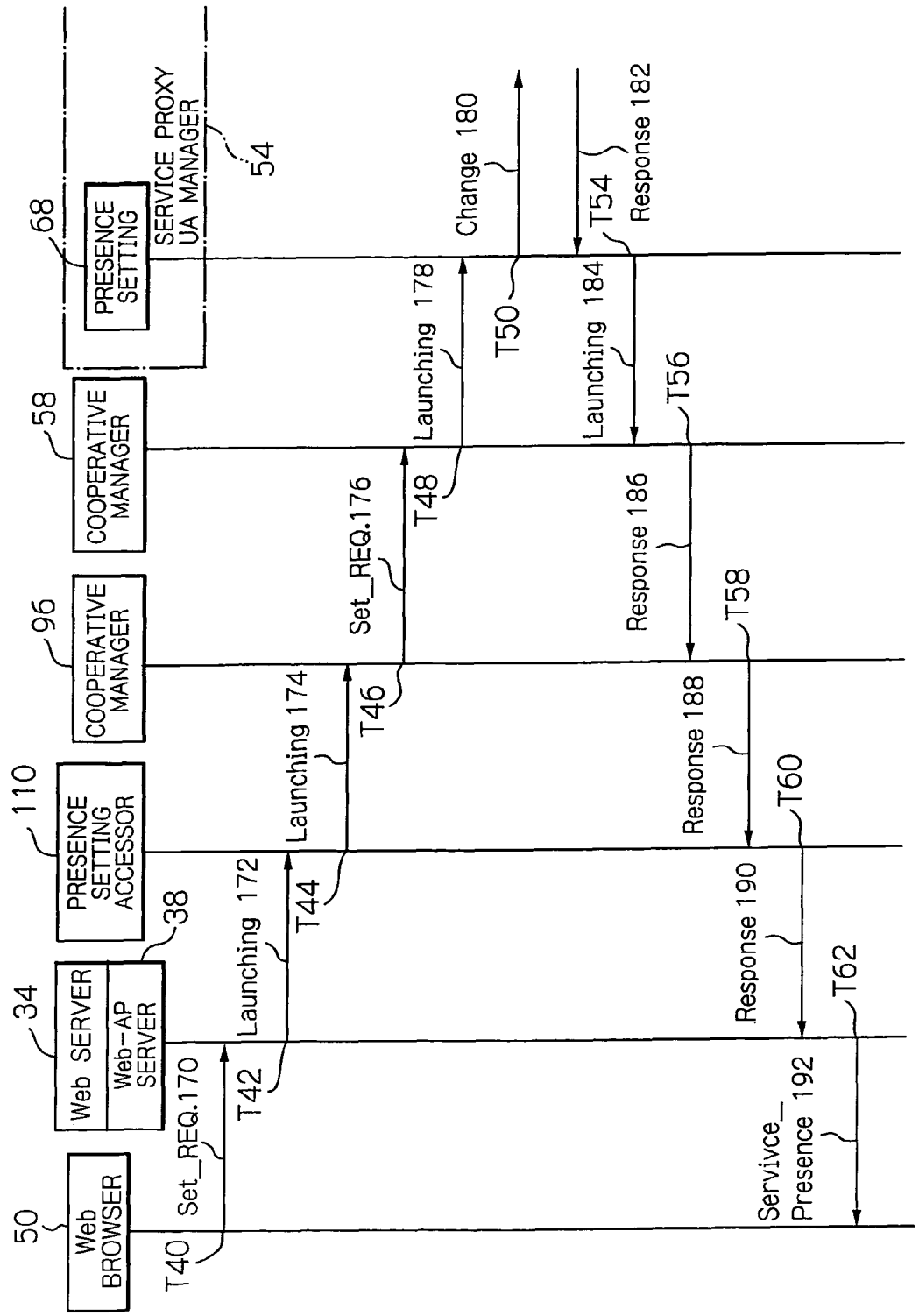

In the processing following thereto, the sequence of operations proceeds in the same sequence as at the timings T44-T58, FIGS. 6A and 6B. To the instant embodiment, the processing of the timings T44-T58 in FIGS. 6A and 6B will become applicable with replacing "FTP" for "Web". Thereafter, the operation will continue from the presence notification to the timings T226-T230, FIG. 15.

The presence setting accessor 110 at a timing T226 returns the results of status notification (Response), as the execution result of the component AP interface 134, to the status change notification accessor 126. The status change notification accessor 126 at a timing T228 returns the result of status notification (Response) 430 to one of the FTP and FTP-AP servers 404 and 408 as an execution result of the component AP interface 136. The appropriate one of the FTP and FTP-AP servers 404 and 408 processes or converts the result of status notification to a form displayable on the FTP client terminal. This displayable form may, for example, be a SIP-URI form. The FTP and FTP-AP servers 404 and 408 at a timing T230 return the processed data (Status_INF) 432 to the FTP client terminal 418 having made the "file transfer request". The FTP client terminal 418 displays the result of the "file transfer request".

By the above operation, the occasion of file transfer from the FTP client 418 causes the file content to be handled as an identifier of the call attempt for changing the status and as a new status content. The file updated by the file transfer causes the status of the call attempt to change. One of the FTP and FTP-AP servers 404 and 408 is able to utilize the scheme of the presence of the corresponding proxy user agent to notify the SIP clients 46 and 48 of the status change in the request information. The processed result is displayed on the FTP client terminal 418 so that the user may be apprized of the result of change in the status. Of course, the status change of the call attempt is notified only to all SIP clients having made a request for communication at the outset.

With this structural configuration, cooperation may be established between applications installed on the FTP and SIP systems 400 and 12, and thereby the construction, execution and management of the Web-VoIP cooperation type of application can readily be implemented. With the present embodiment, it is possible to provide various additional components on the FTP and SIP accessor components 402 and 414 to thereby extend the FTP-VoIP cooperative types. In addition to the SIP and FTP applications 30 and 412 installed, increasing the sorts of the components renders a wide variety of the FTP-VoIP cooperative type of applications implemented. Although the procedure of notifying the status changes has been described, the present invention is not limited to the specific illustrative embodiment described but it is possible to implement other access functions owned by the call attempt manager 100.

Meanwhile, cooperation is not limitedly applicable to VoIP (SIP) and Web applications or to VoIP (SIP) and FTP applications but may be encompassed between various other protocols.

In summary, with the above-stated structure, when a request from the Web browser 50, interconnected to the Web system 14, is executed by a call attempt, the call attempt manager 100 is booted under an HTTP protocol in response to this request. This request is turned by the cooperative manager 96 into a request under the SOAP/CORBA protocol, which is in turn sent to the cooperative manager 58. The cooperative manager 58 turns the request into a request under the SIP communication protocol. The call attempt manager 56 performs the processing on the request. The call attempt manager 56 forwards a response of the result of the processing through the cooperative manager 58, the cooperative manager 96 and the call attempt manager 100 to the Web browser 50, having originated the request, to display the result on the latter. The service proxy UA manager 98, cooperative manager 96, cooperative manager 58 and service proxy UA manager 54 are sequentially actuated for registration. The results of registration are returned in the reverse order to the Web system 14. The task is then executed from the Web system 14 to establish a call in conformity with a calling instance between different types of communication protocol, thus achieving monistic situation management from the perspective of achieving the objective. Since it is unnecessary to reserve HTTP transactions for a prolonged period of time, it is possible to efficiently utilize the resources and the user interface as practical application.

Since the call attempt manager 56 includes the functions of generating and canceling call attempts for an instance of call origination, editing and retrieving information, retrieving and setting statuses, notifying changes in the statuses, and notifying the stagnant conditions of the statuses, while the call attempt manager 100 includes the function of accessing each component of the call attempt manager 56, the statuses may be supervised from, e.g. the Web until the termination of tasks.

By employing one of the protocols, SOAP and CORBA, as a protocol that can be used in common under the SIP and HTTP protocols or the SIP and FTP protocols, it is possible to transmit information even between systems of different environments.

The system configuration of the communication system 10 may be reduced in size by implementing the SIP and Web systems 12 and 14 on one and the same computer. The provision of the functions of the cooperative managers 58 and 96 on a certain function call makes it unnecessary to provide the cooperative managers 58 and 96 as respective distinct components, and hence the overall device may be reduced in size.

By interposing networks between the SIP and Web systems 12 and 14 or between the SIP and FTP systems 12 and 400, the systems can be arranged as a distributed system to provide for flexible arrangement of the communications system.

By constructing the SIP and Web systems 12 and 14 as well as the SIP and FTP systems 12 and 400 on respective computers, and by implementing programs functioning the communication system 10 as the service proxy UA manager 54, call attempt manager 56, cooperative manager 58, service proxy UA manager 98, call attempt manager 100 and cooperative manager 96, the system configuration may further be reduced in size to cope flexibly with requests for addition or deletion of component parts and updating the systems.

Moreover, with the service providing method of the present invention, in response to a call attempt and a status consistent with a task selected from the contact list in the Web system 14, the boot signals 236 and 238, including the status, are sequentially generated to execute the sequentially operating cooperative management processing. The boot signal 242 is generated by the SIP system 12, processing information in keeping with the functions booted by the boot signal 242, generating the boot signal 248 inclusive of the response information 246 responsive to the information processing, returning the response information 246 to the Web browser 50 in the Web system 14 through cooperative management processing. From the Web system 14, the proxy user agent is made access to in the service proxy UA manager 54 in the SIP system 12 to register information on the task, notifying the Web system 14 of the completion of registration. Thereafter, the SIP system 12 is activated from the Web system 14 to establish communication of the SIP clients 46 and 48 in the SIP system 12. Thus, tasks may be executed from the Web to establish the communication process management type of applications. Since HTTP transactions need not be reserved for long, it is possible to accomplish efficacious utilization of resources.

In the service providing method, status changes are supplied, upon the termination of communication, from the SIP system 12 to the Web system 14 to boot the function of accessing the status setting of a call attempt in the Web system 14, booting the setting function of the call attempt status in the SIP system 12 through cooperative management processing, and sending, after status changes, the response signal 294 responsive to changes in the status to the Web browser 50 of the web system 14 through cooperative management processing for display thereon. The status changes of the SIP clients may thus be comprehended on the Web.

Moreover, in the service providing method, in response to status change, booted is one of the functions of notifying changes in the status of a call attempt in the SIP system 12 and of accessing the notification of the status change of a call attempt in the Web system 14, and in response the functions of setting the presence in the proxy UA responsive to the notifying or accessing function and of accessing the presence setting function are booted to notify the status changes to the SIP clients 46 and 48 interconnected to the SIP system 12 and having made an in-advance request to allow the status change to be grasped on the Web viewing screen.

Moreover, with a service providing method, if the statuses remain unchanged even after the lapse of a predetermined period of time, either of the functions of notifying the stagnant condition of the statuses of a call attempt in the SIP system and of accessing the notification of stagnant conditions of the statuses of a call attempt in another system may be booted and, responsive to this booting, the function of setting the presence in the proxy user agent as well as the function of accessing the presence setting function may be booted to notify change in the statuses in the SIP clients 46 and 48 which are interconnected to the SIP system 12 and having made a request at the outset, thus enabling more prompt accommodation.

A call attempt brings into play, depending on a task, the functions of generating and deleting an instance of call origination of a client interconnected to the SIP system 12, of editing and retrieving information, the functions of retrieving, setting and change notification of the statuses, and of notifying the stagnant condition of the statuses. The Web system 14 allows an access to the functions owned by the SIP system 12 depending on a task, thereby enabling the user interface to readily be implemented as practical application.

By employing either of the protocols, SOAP or CORBA, as a protocol handled common to the SIP and HTTP protocols or to the SIP and FTP protocols, it becomes possible to transfer information even over systems of different environments.

The entire disclosure of Japanese patent application No. 2004-113749 filed on Apr. 8, 2004, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A service providing system for transmitting and receiving information to and from a plurality of clients interconnected to a plurality of systems constructed in environments of different communication protocols for providing the information as a service, comprising:
   a first system operating based on a first communication protocol; and
   a second system operating based on a second communication protocol;
   said first system including:
   a first cooperative manager for processing first information to be sent to said second system in accordance with a third communication protocol as second information to be dealt with in common to the first communication protocol and the second communication protocol cooperative with each other, and third information provided from said second system in accordance with the third communication protocol as fourth information in accordance with the first communication protocol;
   a first proxy manager for regarding a requested service instance to be a client of said first system to virtually supervise the instance as a user agent, and for operating the information supervised; and
   a first call attempt manager for operating and managing information in a call attempt which is an instance of an object from call origination by one of the clients interconnected to said first system until accomplishment of an objective of call;
   said second system including:
   a second cooperative manager for processing the third information to be sent to said first system in accordance with the third communication protocol, and for processing the second information received from said first system as fifth information in accordance with the second communication protocol;
   a second proxy manager for accessing a corresponding function of said first proxy manager in connection with the requested service instance from said second system by a virtual user agent, and for acquiring a result of execution of the service instance; and
   a second call attempt manager for accessing a corresponding function of said first call attempt manager from said second system.

2. The service providing system according to claim 1, wherein said first call attempt manager includes a function of generating and deleting the call attempt corresponding to the instance of the call origination, information editing, information retrieval, retrieving, setting and notifying a change of statuses representing accomplishment of an objective, and of notifying a stagnant condition of the statuses extending over a predetermined period of time;
   said second call attempt manager including a function of accessing said functions of said first call attempt manager.

3. The service providing system according to claim 2, wherein the first communication protocol is a session initiation protocol, the second communication protocol being a hyper text transfer protocol, the third communication protocol being one of protocols, SOAP (Simple Object Access Protocol) and CORBA (Common Object Request Broker Architecture), which can be handled in the first and second communication protocols.

4. The service providing system according to claim 2, the first communication protocol is a session initiation protocol, the second communication protocol being a file transfer protocol, the third communication protocol being one of protocols, SOAP (Simple Object Access Protocol) and CORBA (Common Object Request Broker Architecture), which can be handled in the first and second communication protocols.

5. The service providing system according to claim 3, wherein said first and second systems are implemented on a single computer.

6. The service providing system according to claim 4, wherein said first and second systems are implemented on a single computer.

7. The service providing system according to claim 5, wherein said first and second cooperative manager are implemented by a function call.

8. The service providing system according to claim 6, wherein said first and second cooperative manager are implemented by a function call.

9. The service providing system according to claim 7, wherein a network is interposed between said first and second systems.

10. The service providing system according to claim 8, wherein a network is interposed between said first and second systems.

11. A program for operating a service providing system for transmitting and receiving information to and from a plurality of clients interconnected to a plurality of systems constructed in environments of different communication protocols for providing the information as a service, wherein the plurality of systems comprise a first system operating based on a first communication protocol, and a second system operating based on a second communication protocol, the first and second systems being implemented by respective computers,
   said first system including:
   a first cooperative manager for processing first information to be sent to said second system in accordance with a third communication protocol as second information to be dealt with in common to the first communication protocol and the second communication protocol cooperative with each other, and third information provided from said second system in accordance with the third communication protocol as fourth information in accordance with the first communication protocol;

a first proxy manager for regarding a requested service instance to be a client of said first system to virtually supervise the instance as a user agent, and for operating the information supervised; and a first call attempt manager for operating and managing information in a call attempt which is an instance of an object as from call origination by one of the clients interconnected to said first system until accomplishment of an objective of call;

said second system including:

a second cooperative manager for processing the third information to be sent to said first system in accordance with the third communication protocol, and for processing the second information supplied from said first system as fifth information in accordance with the second communication protocol;

a second proxy manager for accessing a corresponding function of said first proxy manager in connection with the requested service instance from said second system by a virtual user agent, and for acquiring a result of execution of the service instance; and a second call attempt manager for accessing a corresponding function of said first call attempt manager from said second system, said program being run on said computers to operate said first proxy manager, said first call attempt manager and said first cooperative manager, and said second proxy manager, said second call attempt manager and said second cooperative manager.

12. A method of providing a service by transmitting and receiving information to and from a plurality of clients interconnected to a plurality of systems constructed in environments of different communication protocols for providing the information as a service, comprising:

a first step of preparing a first system operating in accordance with a first communication protocol and a second system operating in accordance with a second communication protocol;

a second step of processing first information to be sent out from the first system in accordance with a third communication protocol as second information to be dealt with in common to the first communication protocol and the second communication protocol cooperative with each other;

a third step of processing the second information received by the second system as third information in accordance with the second communication protocol to output the third information;

a fourth step of processing fourth information supplied to the second system in accordance with the second communication protocol as fifth information in accordance with the third communication protocol to send out the fifth information;

a fifth step of processing the fifth information received by the first system as sixth information in accordance with the first communication protocol to output the first information;

a sixth step of regarding as a call attempt an instance of an object from call origination by one of clients interconnected to the first system until accomplishment of an objective of call, selecting, among clients of the second system, a candidate of communication as a task from a contact list of candidates of communication, and generating a first boot signal booting an access from the second system to a corresponding function of the first system, inclusive of a status representing a state of accomplishment of an objective, responsive to the call attempt consistent with the selected task and with the status;

a seventh step of generating a second boot signal for booting said fourth step, in connection with the first boot signal;

an eighth step of sequentially executing said fourth and fifth steps;

a ninth step of generating a third boot signal for booting a corresponding function in said first system;

a tenth step of processing information corresponding to the function booted by the third boot signal;

an eleventh step of generating, responsive to a response signal to said tenth step, a fourth boot signal booting said second step and including the response signal;

a twelfth step of sequentially executing said second and third steps;

a thirteenth step of returning the response signal to a source which has generated the second boot signal;

a fourteenth step of returning the response signal to a source which has generated the first boot signal;

a fifteenth step of processing the response signal to send the processed response signal to the clients of the second system, accessing a proxy user agent, which acts as a proxy for the selected task as a virtual user agent, through said fourth and fifth steps, to register the information on the task, and receiving a response to the registration through said second and third steps; and a sixteenth step of booting, responsive to the response to the registration, the first system from the second system through said fourth and fifth steps to establish communication between the clients of the first system.

13. The method according to claim 12, wherein, with termination of the communication, a change in the status is sent from the first system to the second system, a function of accessing setting of the status of the call attempt is booted in the second system, a function of setting the status of the call attempt is booted in the first system through said fourth and fifth steps to change the status, a response signal of a change in the status is thereafter sent through said first and second steps to the second system, and the response signal of the change in the status is sent to the clients of the second system for display.

14. The method according to claim 12, wherein either one of functions of notifying a change in the status of the call attempt in the first system responsive to the change in the status, and of accessing a notice of the change in the status of the call attempt in the second system responsive to the change in the status is booted;

responsive to the booting, either one of functions of setting presence in the proxy user agent and of accessing the function setting the presence is booted to notify the change in the status to the client interconnected to the first system and having made a request in advance.

15. The method according to claim 12, wherein when the status remains unchanged after lapse of a predetermined period of time, one of functions of notifying a stagnant condition of the status of the call attempt in the first system and of accessing notification of the stagnant condition of the status of the call attempt in the second system is booted;

responsive to the booting, either of the functions of setting presence in the proxy user agent and of accessing the presence setting function is booted to notify the change of the status to the client interconnected to the first system and having made a request in advance.

16. The method according to claim 12, wherein the call attempt operates in the first system, selectively in responsive to the task, functions of generating and deleting an instance of call origination of the clients interconnected to the first system, of information edition and retrieval, of retrieving, setting and notifying the change of the status and of notifying the stagnant condition of the status;

the functions in the first system being accessed through the second system depending on the task.

17. The method according to claim 13, wherein the call attempt operates in the first system, selectively in responsive to the task, functions of generating and deleting an instance of call origination of the clients interconnected to the first system, of information edition and retrieval, of retrieving, setting and notifying the change of the status and of notifying the stagnant condition of the status;

the functions in the first system being accessed through the second system depending on the task.

18. The method according to claim 14, wherein the call attempt operates in the first system, selectively in responsive to the task, functions of generating and deleting an instance of call origination of the clients interconnected to the first system, of information edition and retrieval, of retrieving, setting and notifying the change of the status and of notifying the stagnant condition of the status;

the functions in the first system being accessed through the second system depending on the task.

19. The method according to claim 15, wherein the call attempt operates in the first system, selectively in responsive to the task, functions of generating and deleting an instance of call origination of the clients interconnected to the first system, of information edition and retrieval, of retrieving, setting and notifying the change of the status and of notifying the stagnant condition of the status;

the functions in the first system being accessed through the second system depending on the task.

20. The method according to claim 18, wherein the first communication protocol is a session initiation protocol, the second communication protocol being a hyper text transfer protocol, the third communication protocol being one of the protocols, SOAP (Simple Object Access Protocol) and CORBA (Common Object Request Broker Architecture), which can be handled in the first and second communication protocols.

21. The method according to claim 19, wherein the first communication protocol is a session initiation protocol, the second communication protocol being a hyper text transfer protocol, the third communication protocol being one of the protocols, SOAP (Simple Object Access Protocol) and CORBA (Common Object Request Broker Architecture), which can be handled in the first and second communication protocols.

* * * * *